US011929579B2

(12) United States Patent
Kawasaki et al.

(10) Patent No.: US 11,929,579 B2
(45) Date of Patent: Mar. 12, 2024

(54) ELECTRICAL CONNECTOR AND ELECTRONIC DEVICE

(71) Applicant: MITSUMI ELECTRIC CO., LTD., Tokyo (JP)

(72) Inventors: Takashi Kawasaki, Tokyo (JP); Hiroyuki Sadohara, Tokyo (JP); Taro Mizue, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/304,230

(22) Filed: Apr. 20, 2023

(65) Prior Publication Data

US 2023/0261421 A1 Aug. 17, 2023

Related U.S. Application Data

(63) Continuation of application No. 17/657,321, filed on Mar. 30, 2022, now Pat. No. 11,670,896, which is a (Continued)

(30) Foreign Application Priority Data

Oct. 18, 2019 (JP) ................................ 2019-191574
Oct. 18, 2019 (JP) ................................ 2019-191575
Oct. 18, 2019 (JP) ................................ 2019-191576

(51) Int. Cl.

*H01R 13/6471* (2011.01)
*H01R 13/52* (2006.01)
*H01R 107/00* (2006.01)

(52) U.S. Cl.

CPC ..... *H01R 13/6471* (2013.01); *H01R 13/5202* (2013.01); *H01R 2107/00* (2013.01)

(58) Field of Classification Search

CPC ............ H01R 13/6471; H01R 13/6473; H01R 13/6474; H01R 13/6476; H01R 13/6581; (Continued)

(56) References Cited

U.S. PATENT DOCUMENTS 6,334,781 B1 1/2002 Nishio et al.
7,690,947 B2 4/2010 Gu et al.
(Continued)

FOREIGN PATENT DOCUMENTS

JP 2017517118 A 6/2017
JP 2018170195 A 11/2018
JP 2019057501 A 4/2019

*Primary Examiner* — Marcus E Harcum
(74) *Attorney, Agent, or Firm* — McCoy Russell LLP

(57) ABSTRACT

An electrical connector contains a first contact group arranged on a first contact plane, a second contact group arranged on a second contact plane and a ground plate located on a ground plane. The ground plate is located between horizontally extending portions of the contacts of the first contact group and horizontally extending portions, downwardly extending portions and terminal portions of the contacts of the second contact group in addition to between contacting portions and the horizontally extending portions of the contacts of the first contact group and contacting portions and the horizontally extending portions of the contacts of the second contact group.

12 Claims, 20 Drawing Sheets

Related U.S. Application Data continuation of application No. 17/062,488, filed on Oct. 2, 2020, now Pat. No. 11,336,057.

(58) Field of Classification Search
CPC ............ H01R 13/6585; H01R 13/6586; H01R 13/6587; H01R 13/6588; H01R 13/5202; H01R 2107/00; H01R 12/712; H01R 12/714; H01R 12/716; H01R 12/724; H01R 24/60
USPC ................................ 439/271, 607.56, 607.55
See application file for complete search history.

(56) References Cited

U.S. PATENT DOCUMENTS

| | | | | |
|---|---|---|---|---|
| 7,758,380 | B2 | 7/2010 | Wang et al. | |
| 8,764,488 | B2 | 7/2014 | Zeng | |
| 9,685,739 | B2 | 6/2017 | Chen et al. | |
| 9,728,916 | B1 | 8/2017 | Tsai et al. | |
| 9,742,098 | B2 | 8/2017 | Zhao et al. | |
| 9,748,701 | B2 | 8/2017 | Tsai et al. | |
| 9,755,371 | B2 | 9/2017 | Zhao et al. | |
| 9,774,143 | B1 | 9/2017 | Su et al. | |
| 9,865,974 | B2 | 1/2018 | Chen et al. | |
| 10,074,927 | B1 | 9/2018 | Ono | |
| 10,079,456 | B2 | 9/2018 | Chen et al. | |
| 10,403,565 | B1 | 9/2019 | Henry et al. | |
| 10,446,972 | B2 | 10/2019 | Ono | |
| 10,541,499 | B2 | 1/2020 | Tada | |
| 10,804,643 | B2 | 10/2020 | Tada et al. | |
| 11,075,490 | B2 | 7/2021 | Tsai et al. | |
| 11,245,232 | B2 | 2/2022 | Oosaka | |
| 2004/0023527 | A1 | 2/2004 | Nishio et al. | |
| 2010/0093208 | A1 | 4/2010 | Hamner et al. | |
| 2010/0151733 | A1 | 6/2010 | Tsou | |
| 2013/0130549 | A1 | 5/2013 | Wu et al. | |
| 2013/0171885 | A1 | 7/2013 | Zhang | |
| 2014/0357124 | A1 | 12/2014 | Zhao et al. | |
| 2015/0056839 | A1 | 2/2015 | Zhang | |
| 2015/0072562 | A1 | 3/2015 | Little et al. | |
| 2015/0126069 | A1 | 5/2015 | Little et al. | |
| 2015/0200495 | A1 | 7/2015 | Yu et al. | |
| 2015/0200504 | A1 | 7/2015 | Little et al. | |
| 2015/0222059 | A1 | 8/2015 | Little et al. | |
| 2015/0229077 | A1 | 8/2015 | Little et al. | |
| 2015/0244111 | A1 | 8/2015 | Ju et al. | |
| 2015/0255905 | A1 | 9/2015 | Little et al. | |
| 2015/0255925 | A1 | 9/2015 | Katayanagi | |
| 2015/0270661 | A1 | 9/2015 | Kao et al. | |
| 2016/0013592 | A1 | 1/2016 | Kao et al. | |
| 2016/0013593 | A1 | 1/2016 | Kao et al. | |
| 2016/0013596 | A1 | 1/2016 | Regnier | |
| 2016/0013599 | A1 | 1/2016 | Ueda et al. | |
| 2016/0064870 | A1 | 3/2016 | Yu et al. | |
| 2016/0079712 | A1 | 5/2016 | Chung et al. | |
| 2016/0315424 | A1 | 10/2016 | Tsai et al. | |
| 2016/0329645 | A1 | 11/2016 | Tsai et al. | |
| 2016/0352051 | A1 | 12/2016 | Tsai et al. | |
| 2016/0352052 | A1* | 12/2016 | Yu | H01R 13/6585 |
| 2016/0359256 | A1 | 12/2016 | Zhang | |
| 2017/0070013 | A1 | 3/2017 | Hsu et al. | |
| 2017/0085040 | A1 | 3/2017 | Tsai et al. | |
| 2017/0187140 | A1 | 6/2017 | Tsai et al. | |
| 2017/0222374 | A1 | 8/2017 | Saito et al. | |
| 2017/0264054 | A1* | 9/2017 | Zhao | H01R 13/6593 |
| 2017/0279226 | A1* | 9/2017 | Tsai | H01R 13/6581 |
| 2017/0294726 | A1* | 10/2017 | Tsai | H01R 13/6581 |
| 2017/0294727 | A1 | 10/2017 | Tsai et al. | |
| 2017/0365951 | A1 | 12/2017 | Zhang et al. | |
| 2018/0109042 | A1* | 4/2018 | Little | H01R 24/60 |
| 2018/0115119 | A1 | 4/2018 | Little et al. | |
| 2018/0183186 | A1 | 6/2018 | Yu et al. | |
| 2018/0191092 | A1 | 7/2018 | Zhou et al. | |
| 2018/0287290 | A1 | 10/2018 | Kifune et al. | |
| 2018/0287291 | A1 | 10/2018 | Kifune et al. | |
| 2018/0294596 | A1 | 10/2018 | Zhang et al. | |
| 2018/0323530 | A1* | 11/2018 | Hou | H01R 13/506 |
| 2019/0020154 | A1 | 1/2019 | Wan et al. | |
| 2019/0044287 | A1 | 2/2019 | Lin et al. | |
| 2019/0067860 | A1 | 2/2019 | Zhao | |
| 2019/0089077 | A1* | 3/2019 | Huang | H01R 12/716 |
| 2019/0165526 | A1 | 5/2019 | Huang et al. | |
| 2019/0229470 | A1 | 7/2019 | Cheng et al. | |
| 2019/0288465 | A1 | 9/2019 | Little et al. | |
| 2019/0348808 | A1 | 11/2019 | Zhao et al. | |
| 2019/0363495 | A1 | 11/2019 | Ju et al. | |
| 2020/0014158 | A1* | 1/2020 | Chien | H01R 13/6581 |
| 2020/0076134 | A1 | 3/2020 | Su et al. | |
| 2020/0194926 | A1* | 6/2020 | Suzuki | H01R 13/6581 |
| 2020/0295497 | A1 | 9/2020 | Suzuki | |
| 2020/0313342 | A1 | 10/2020 | Zhao et al. | |
| 2021/0006015 | A1 | 1/2021 | Xu et al. | |
| 2021/0066860 | A1 | 3/2021 | Yang | |
| 2021/0075143 | A1 | 3/2021 | Laurx et al. | |
| 2021/0384679 | A1 | 12/2021 | Liao | |

* cited by examiner

ELECTRICAL CONNECTOR AND ELECTRONIC DEVICE

CROSS-REFERENCE TO RELATED APPLICATIONS

The present application is a continuation of U.S. Non-Provisional patent application Ser. No. 17/657,321, entitled, "ELECTRICAL CONNECTOR AND ELECTRONIC DEVICE," and filed on Mar. 30, 2022. U.S. Non-Provisional patent application Ser. No. 17/657,321 is a continuation of U.S. Non-Provisional patent application Ser. No. 17/062,488, entitled "ELECTRICAL CONNECTOR AND ELECTRONIC DEVICE", and filed on Oct. 2, 2020. U.S. Non-Provisional patent application Ser. No. 17/062,488 claims priority to Japanese Patent Application No. 2019-191574 filed on Oct. 18, 2019, Japanese Patent Application No. 2019-191575 filed on Oct. 18, 2019, and Japanese Patent Application No. 2019-191576 filed on Oct. 18, 2019. The entire contents of each of the above-listed applications are hereby incorporated by reference for all purposes.

TECHNICAL FIELD

The present disclosure generally relates to electrical connectors and electronic devices containing the electrical connector. In one aspect, the present disclosure relates to an electrical connector comprising a ground plate located between horizontally extending portions of contacts of a first contact group and horizontally extending portions, downwardly extending portions and terminal portions of contacts of a second contact group in addition to between contacting portions and the horizontally extending portions of the contacts of the first contact group and contacting portions and the horizontally extending portions of the contacts of the second group in order to suppress crosstalk between the contacts of the first contact group arranged on an upper side and the contacts of the second contact group arranged on a lower side, and an electronic device comprising the electrical connector.

In another aspect, the present disclosure relates to an electrical connector comprising two contacts for transmitting a differential signal, each of which has a narrow pitch portion approaching from one of the two contacts toward the other one of the two contacts in order to suppress crosstalk due to the two contacts, and an electronic device comprising the electrical connector.

In yet another aspect, the present disclosure relates to an electrical connector which can suppress crosstalk due to two contacts constituting a signal contact pair for transmitting a differential signal in an area where an opening of a ground plate is formed even if the ground plate has the opening facing the two contacts, and an electronic device comprising the electrical connector.

BACKGROUND

Conventionally, electrical connectors have been used for electrically connecting an electronic device and another electronic device. In order to obtain an electrical connection between the electronic device and the other electronic device, two types of electrical connectors are used in combination. Namely, one of the two types of the electrical connector is a receptacle connector which is mounted on a circuit board provided in a housing of the electronic device and whose insertion port is exposed toward the outside of the electronic device from a through-hole formed in the housing of the electronic device and the other one of the two types of the electrical connector is a plug connector inserted into the insertion port of the receptacle connector.

Further, as electronic devices have downsized in recent years, needs for miniaturization of the electrical connectors increase. For responding to the needs for the miniaturization of the electrical connectors, a USB Type-C standard has been proposed (see patent documents 1 and 2). An electrical connector conforming to the USB Type-C standard employs a vertically symmetrical design. This design enables to insert a plug connector (a corresponding connector) of the USB Type-C standard into a receptacle connector of the USB Type-C standard regardless of the vertical orientation of each connector.

For example, FIG. 1 shows a conventional electrical connector 800 having a waterproof function, which conforms to the USB Type-C standard. The electrical connector 800 contains a metal shell 810 and an inner structure 820 contained in the shell 810. As shown in FIG. 2, the inner structure 820 contains a first contact group 830U constituted of a plurality of contacts 830 arranged on a first contact plane, a second contact group 830L constituted of a plurality of contacts 830 arranged on a second contact plane, a ground plate 840 arranged on a ground plane between the first contact plane and the second contact plane, an insulating housing 850 for holding the first contact group 830U, the second contact group 830L and the ground plate 840 and a waterproof sealing portion 860 (see FIG. 3) for liquid-tightly sealing an inside of the housing 850.

Each of the first contact group 830U and the second contact group 830L contains two high frequency signal contact pairs each constituted of two contacts for transmitting a high frequency differential signal with respect to a corresponding connector, a normal signal contact pair constituted of two normal signal contacts for transmitting a normal frequency differential signal with respect to the corresponding connector and a plurality of non-signal contacts used for other purposes than signal transmission.

The housing 850 contains a top housing 850T integrally molded with the first contact group 830U and a bottom housing 850B integrally molded with the second contact group 830L and the ground plate 840. The top housing 850T is obtained by insert-molding the plurality of contacts 830 to be arranged on the first contact plane with an insulating resin material. Similarly, the bottom housing 850B is obtained by insert-molding the plurality of contacts 830 to be arranged on the second contact plane and the ground plate 840 to be arranged on the ground plate plane with the insulating resin material.

The waterproof sealing portion 860 is formed in the housing 850 by filling the housing 850 with an elastomer material through filling openings 870 of the top housing 850T and the bottom housing 850B in a state that a lower surface of the top housing 850T and an upper surface of the bottom housing 850B have been closely contacted with each other to liquid-tightly seal the inside of the housing 850. After that, the top housing 850T and the bottom housing 850B are over-molded to obtain the housing 850.

FIG. 3 shows a cross-sectional view of the electrical connector 800 of FIG. 1 taken along an A-A line in FIG. 1. As shown in FIG. 3, each of the plurality of contacts 830 of the first contact group 830U and the second contact group 830L has a contacting portion 831 to be contacted with a corresponding contact of the corresponding connector, a horizontally extending portion 832 which horizontally extends from the contacting portion 831 toward a base side, a downwardly extending portion 833 which downwardly extends from the horizontally extending portion 832 and a terminal portion 834 which extends from the downwardly extending portion 833 toward the base side.

A receptacle connector such as the electrical connector 800 conforming to the USB Type-C standard is very compact and has a short separation distance between the contacts 830 of the first contact group 830U and the contacts 830 of the second contact group 830L. Therefore, there is a problem of crosstalk occurring between the upper and lower contacts 830 when currents flow in the contacts 830 of the first contact group 830U and the contacts 830 of the second contact group 830L. In the receptacle connector conforming to the USB Type-C standard, the ground plate 840 is arranged between the contacts 830 of the first contact group 830U and the contacts 830 of the second contact group 830L in order to suppress the crosstalk.

On the other hand, in order to form the waterproof sealing portion 860 in the housing 850 for liquid-tightly sealing the inside of the housing 850, it is necessary to fill the elastomer material within the housing 850 when the elastomer material is filled into the housing 850 through the filling openings 870 of the top housing 850T and the bottom housing 850B. In order to ensure flowability of the elastomer material in the housing 850, flow openings 841 are formed in the ground plate 840.

As shown in FIG. 2, since the ground plate 840 is provided on an upper surface of the bottom housing 850B, a length (a length in an insertion and extraction direction of the corresponding connector) of the ground plate 840 is limited by a length of the upper surface of the bottom housing 850B. Thus, although the ground plate 840 is located on the upper side of the contacting portions 831 and tip end portions of the horizontally extending portions 832 of the contacts 830 of the second contact group 830L, the ground plate 840 is not located on the upper side of base side portions of the horizontally extending portions 832, the downwardly extending portions 833 and the terminal portions 834 of the contacts 830 of the second contact group 830L. Thus, as shown in FIG. 3, there is an area, where the ground plate 840 does not exist, between the contacts 830 of the first contact group 830U and the contacts 830 of the second contact group 830L in a state that the electrical connector 800 is assembled.

As described above, in the electrical connector 800 of the prior art, there is the area, where the ground plate 840 does not exist, between the contacts 830 of the first contact group 830U and the contacts 830 of the second contact group 830L. Thus, there is a problem that crosstalk between the contacts 830 of the first contact group 830U and the contacts 830 of the second contact group 830L cannot be suppressed in this area and electrical characteristics of the electrical connector 800 cannot be improved.

Further, the differential signals each having a predetermined frequency or more respectively flow in the high frequency signal contact pairs and the normal signal contact pairs among the contacts 830 of the first contact group 830U and the contacts 830 of the second contact group 830L. Therefore, an influence of the crosstalk due to the high frequency signal contact pairs and the normal signal contact pairs for transmitting the differential signals are particularly large. Thus, in order to improve the electrical characteristics of the electrical connector 800, it is particularly necessary to suppress the crosstalk due to the high frequency signal contact pairs and the normal signal contact pairs.

However, even if the ground plate 840 as described above is used, it is difficult to completely eliminate the influence of the crosstalk due to the high frequency signal contact pairs and the normal signal contact pairs.

Furthermore, there is no metal members for suppressing the crosstalk between the upper and lower contacts 830 in areas where the flow openings 841 of the ground plate 840 are formed. Thus, it is impossible to suppress the crosstalk between the upper and lower contacts 830 in these areas. In particular, the influences of the crosstalk due to the high frequency signal contact pairs and the normal signal contact pairs in these areas are large. Thus, there is a problem that the electrical characteristics of the electrical connector 800 deteriorate.

In recent years, the amount of data transmitted and received using a connector such as the electrical connector 800 has increased due to improvement in computation capability of a processor, increase in capacity of a storage device such as a memory and improvement in a communication speed. Thus, a frequency of the differential signal transmitted by the high frequency signal contact pair especially tends to increase. As the frequency of the differential signal transmitted by the high frequency signal contact pair increases, the influence of the crosstalk due to the high frequency signal contact pair also increases. The increase in the influence of the crosstalk due to the high frequency signal contact pair deteriorates the electrical characteristics of the electrical connector 800. Therefore, in particular, there are needs of a technique for suppressing the crosstalk due to the high frequency signal contact pair.

RELATED ART DOCUMENTS

Patent Documents

JP 2018-170195A
JP 2019-57501A

SUMMARY

Problems to be Solved by the Disclosure

The present disclosure has been made in view of the above-mentioned conventional problems. A first object of the present disclosure is to provide an electrical connector which can effectively suppress the crosstalk between the first contact group arranged on the upper side and the second contact group arranged on the lower side, and an electronic device comprising the electrical connector.

A second object of the present disclosure is to provide an electrical connector which can suppress the crosstalk due to the two contacts for transmitting the differential signal, and an electronic device comprising the electrical connector.

A third object of the present disclosure is to provide an electrical connector which can suppress the crosstalk due to the two contacts in the area where the opening is formed even if the ground plate has the opening facing the two contacts constituting the signal contact pair for transmitting the differential signal, and an electronic device comprising the electrical connector.

Means for Solving the Problems

Such objects are achieved by the following present disclosures. In particular, the first object of the present disclosure is achieved by the present disclosures according to the following (1) to (9).

(1) An electrical connector which can engage with a corresponding connector inserted from a tip side thereof, comprising:

an insulating housing;

a first contact group constituted of a plurality of contacts linearly extending along an insertion and extraction direction of the corresponding connector and held by the housing so as to be arranged on a first contact plane;

a second contact group constituted of a plurality of contacts linearly extending along the insertion and extraction direction of the corresponding connector and held by the housing so as to be arranged on a second contact plane facing the first contact plane; and a ground plate held by the housing so as to be located on a ground plane facing the first contact plane and the second contact plane between the first contact plane and the second contact plane, wherein each of the contacts of the first contact group and the second contact group has a contacting portion which is located on the tip side and to be contacted with the corresponding connector, a horizontally extending portion horizontally extending from the contacting portion toward a base side, a downwardly extending portion downwardly extending from the horizontally extending portion and a terminal portion extending from the downwardly extending portion toward the base side, and wherein the ground plate is located between the horizontally extending portions of the contacts of the first contact group and the horizontally extending portions, the downwardly extending portions and the terminal portions of the contacts of the second contact group in addition to between the contacting portions and the horizontally extending portions of the contacts of the first contact group and the contacting portions and the horizontally extending portions of the contacts of the second contact group.

(2) The electrical connector according to the above (1), wherein the ground plate contains:

a first ground plate piece located between the contacting portions and the horizontally extending portions of the contacts of the first contact group and the contacting portions and the horizontally extending portions of the contacts of the second contact group, and a second ground plate piece located between the horizontally extending portions of the contacts of the first contact group and the horizontally extending portions, the downwardly extending portions and the terminal portions of the contacts of the second contact group.

(3) The electrical connector according to the above (2), wherein the second ground plate piece further extends so as to be located between the downwardly extending portions of the contacts of the first contact group and the downwardly extending portions and the terminal portions of the contacts of the second contact group.

(4) The electrical connector according to the above (2) or (3), wherein the second ground plate piece is separated from the first ground plate piece, and wherein the second ground plate piece and the first ground plate piece are not electrically connected to each other.

(5) The electrical connector according to any one of the above (2) to (4), further comprising a shield member located outside the housing, and wherein the second ground plate piece is electrically connected to the shield member.

(6) The electrical connector according to the above (2) or (3), wherein the second ground plate piece and the first ground plate piece are electrically connected to each other.

(7) The electrical connector according to any one of the above (2) to (6), wherein the housing contains a top housing for holding the first contact group and the second ground plate piece and a bottom housing for holding the second contact group and the first ground plate piece.

(8) The electrical connector according to the above (7), wherein the second ground plate piece includes a flat plate-like body portion and a pair of protruding portions formed on both end portions of the body portion in a width direction of the body portion perpendicular to the insertion and extraction direction of the corresponding connector so as to upwardly extend from the body portion, wherein the top housing has a pair of press-fitting grooves, and wherein the second ground plate piece is fixed to the top housing by respectively press-fitting the pair of protruding portions of the second ground plate piece into the pair of press-fitting grooves of the top housing (9) An electronic device comprising:

a housing;

a circuit board provided in the housing; and the electrical connector defined by any one of the above (1) to (8), which is mounted on the circuit board.

Further, the second object of the present disclosure is achieved by the present disclosures according to the following (10) to (22).

(10) An electrical connector which can engage with a corresponding connector inserted from a tip side thereof, comprising:

a contact group constituted of a plurality of contacts linearly extending along an insertion and extraction direction of the corresponding connector and arranged on a contact plane; and a ground plate arranged on a ground plane facing the contact plane, wherein the contact group contains a signal contact pair for transmitting a differential signal, wherein each of the two contacts constituting the signal contact pair has a narrow pitch portion approaching from one of the two contacts toward the other one of the two contacts, and wherein a separation distance between the narrow pitch portions of the two contacts constituting the signal contact pair is smaller than a separation distance between other portions of the two contacts.

(11) The electrical connector according to the above (10), wherein each of the contacts of the contact group has a contacting portion which is located on the tip side and to be contacted with the corresponding connector, a horizontally extending portion horizontally extending from the contacting portion toward a base side, a downwardly extending portion downwardly extending from the horizontally extending portion and a terminal portion extending from the downwardly extending portion toward the base side, and wherein the narrow pitch portion of each of the two contacts of the signal contact pair is formed at the horizontally extending portion.

(12) The electrical connector according to the above (10) or (11), wherein the ground plate has an opening facing the two contacts of the signal contact pair, and wherein the narrow pitch portion of each of the two contacts of the signal contact pair faces the opening of the ground plate.

(13) The electrical connector according to the above (12), wherein a width between the narrow pitch portions of the two contacts of the signal contact pair is smaller than a width of the opening of the ground plate.

(14) The electrical connector according to the above (12) or (13), wherein the signal contact pair of the contact group contains a normal signal contact pair constituted of two normal signal contacts for transmitting a normal frequency differential signal and a high frequency signal contact pair constituted of two high frequency signal contacts for transmitting a high frequency differential signal whose frequency is higher than a frequency of the normal frequency differential signal, and wherein the two high frequency signal contacts constituting the high frequency signal contact pair face the opening of the ground plate.

(15) The electrical connector according to any one of the above (10) to (14), wherein the narrow pitch portion has an approaching portion approaching from the one of the two contacts toward the other one of the two contacts and a straight portion extending from the approaching portion along the insertion and extraction direction.

(16) The electrical connector according to the above (15), wherein a length of the straight portion of the narrow portion of each of the two contacts of the signal contact pair is equal to or larger than twice a width of the contact.

(17) The electrical connector according to the above (15) or (16), wherein a separation distance between the straight portions of the narrow pitch portions of the two contacts of the signal contact pair is equal to or smaller than 1.5 times a width of the contact.

(18) An electrical connector which can engage with a corresponding connector inserted from a tip side thereof, comprising:

a first contact group constituted of a plurality of contacts linearly extending along an insertion and extraction direction of the corresponding connector and arranged on a first contact plane;

a second contact group constituted of a plurality of contacts linearly extending along the insertion and extraction direction of the corresponding connector and arranged on a second contact plane facing the first contact plane; and a ground plate arranged on a ground plane facing the first contact plane and the second contact plane between the first contact plane and the second contact plane, wherein each of the first contact group and the second contact group contains a signal contact pair for transmitting a differential signal, wherein each of the two contacts constituting the signal contact pair of each of the first contact group and the second contact group has a narrow pitch portion approaching from one of the two contacts toward the other one of the two contacts, and wherein a separation distance between the narrow pitch portions of the two contacts constituting the signal contact pairs of each of the first contact group and the second contact group is smaller than a separation distance between other portions of the two contacts.

(19) The electrical connector according to the above (18), wherein the ground plate has an opening facing the two contacts of the signal contact pair of each of the first contact group and the second contact group, and wherein the narrow pitch portion of each of the two contacts of the signal contact pair of the second contact group faces the opening of the ground plate.

(20) The electrical connector according to the above (19), wherein the narrow pitch portion of each of the two contacts of the signal contact pair of the first contact group does not face the opening of the ground plate, and wherein the narrow pitch portion of each of the two contacts of the signal contact pair of the first contact group does not overlap with the narrow pitch portion of each of the two contacts of the signal contact pair of the second contact group in a planar view.

(21) The electrical connector according to the above (19) or (20), wherein the signal contact pair of each of the first contact group and the second contact group contains a normal signal contact pair constituted of two normal signal contacts for transmitting a normal frequency differential signal and a high frequency signal contact pair constituted of two high frequency signal contacts for transmitting a high frequency differential signal whose frequency is higher than a frequency of the normal frequency differential signal, and wherein the two high frequency signal contacts constituting the high frequency signal contact pair of each of the first contact group and the second contact group face the opening of the ground plate.

(22) An electronic device comprising:

a housing;

a circuit board provided in the housing; and the electrical connector defined by any one of the above (10) to (21), which is mounted on the circuit board.

Further, the third object of the present disclosure is achieved by the present disclosures according to the following (23) to (31).

(23) An electrical connector which can engage with a corresponding connector inserted from a tip side thereof, comprising:

an insulating housing;

a first contact group constituted of a plurality of contacts linearly extending along an insertion and extraction direction of the corresponding connector and held by the housing so as to be arranged on a first contact plane;

a second contact group constituted of a plurality of contacts linearly extending along the insertion and extraction direction of the corresponding connector and held by the housing so as to be arranged on a second contact plane facing the first contact plane; and a ground plate held by the housing so as to be located on a ground plane facing the first contact plane and the second contact plane between the first contact plane and the second contact plane, wherein each of the first contact group and the second contact group contains a signal contact pair constituted of two signal contacts for transmitting a differential signal, wherein the ground plate has an opening facing the two signal contacts of the signal contact pair of each of the first contact group and the second contact group, and wherein a separation distance between outer side surfaces of the two signal contacts of the signal contact pair of the first contact group in an area facing the opening of the ground plate is larger than a width of the opening of the ground plate.

(24) The electrical connector according to the above (23), wherein a separation distance between outer side surfaces of the two signal contacts of the signal contact pair of the second contact group in the area facing the opening of the ground plate is smaller than the width of the opening of the ground plate.

(25) The electrical connector according to the above (23) or (24), wherein a center between the two signal contacts of the signal contact pair of the first contact group in a width direction of the two signal contacts of the first contact group, a center between the two signal contacts of the signal contact pair of the second contact group in a width direction of the two signal contacts of the second contact group and a center of the opening of the ground plate in a width direction of the ground plate coincide with each other.

(26) The electrical connector according to the above (24) or (25), wherein the separation distance between the outer side surfaces of the two signal contacts of the signal contact pair of the second contact group in the area facing the opening of the ground plate is smaller than a separation distance between outer side surfaces of other portions of the two signal contacts of the signal contact pair of the second contact group.

(27) The electrical connector according to any one of the above (23) to (26), wherein the opening of the ground plate is a flow opening for ensuring flowability of an elastomer material in the housing when the elastomer material is filled into the housing to form a waterproof sealing portion in the housing for liquid-tightly sealing an inside of the housing.

(28) The electrical connector according to the above (27), wherein the housing contains a top housing and a bottom housing, and wherein the waterproof sealing portion is formed by filling the elastomer material into the housing in a state that a bottom surface of the top housing and an upper surface of the bottom housing have been closely contacted with each other.

(29) The electrical connector according to the above (27) or (28), wherein the waterproof sealing portion blocks a water penetration path from the tip side to a base side in the housing and liquid-tightly seals the inside of the housing.

(30) The electrical connector according to any one of the above (23) to (29), wherein the signal contact pair of each of the first contact group and the second contact group contains a normal signal contact pair constituted of two normal signal contacts for transmitting a normal frequency differential signal and a high frequency signal contact pair constituted of two high frequency signal contacts for transmitting a high frequency differential signal whose frequency is higher than a frequency of the normal frequency differential signal, and wherein the two high frequency signal contacts constituting the high frequency signal contact pair of each of the first contact group and the second contact group face the opening of the ground plate.

(31) An electronic device comprising:

a housing;

a circuit board provided in the housing; and the electrical connector defined by any one of the above (23) to (30), which is mounted on the circuit board.

Effects of the Disclosure

In the electrical connector of the present disclosure, the ground plate is located between the horizontally extending portions of the contacts of the first contact group and the horizontally extending portions, the downwardly extending portions and the terminal portions of the contacts of the second contact group in addition to between the contacting portions and the horizontally extending portions of the contacts of the first contact group and the contacting portions and the horizontally extending portions of the contacts of the second contact group. As described above, the ground plate of the electrical connector of the present disclosure is also located in the area where the ground plate of the prior art is not located and the crosstalk between the contacts of the first contact group and the contacts of the second contact group cannot be suppressed in the prior art. Therefore, it is possible to more effectively suppress the crosstalk between the contacts of the first contact group and the contacts of the second contact group and thus it is possible to improve the electrical characteristics of the electrical connector.

Further, in the electrical connector of the present disclosure, each of the two signal contacts constituting the signal contact pair for transmitting the differential signal has the narrow pitch portion approaching from one of the two signal contacts toward the other one of the two signal contacts. With this configuration, it is possible to suppress the crosstalk in the narrow pitch portions of the signal contacts and thus it is possible to improve the electrical characteristics of the electrical connector.

Further, according to the present disclosure, even if the ground plate has the opening facing the two contacts constituting the signal contact pair for transmitting the differential signal, it is possible to suppress the crosstalk due to the two contacts in the area where the opening of the ground plate is formed and thus it is possible to improve the electrical characteristics of the electrical connector.

DETAILED DESCRIPTION

Figure 1:
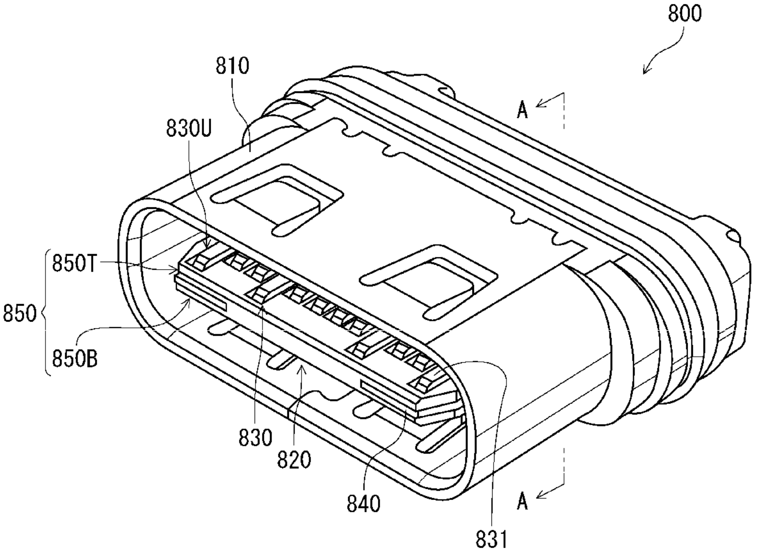
Prior Art Fig. 1
FIG. 1 is a perspective view of a conventional electrical connector.
Figure 2:
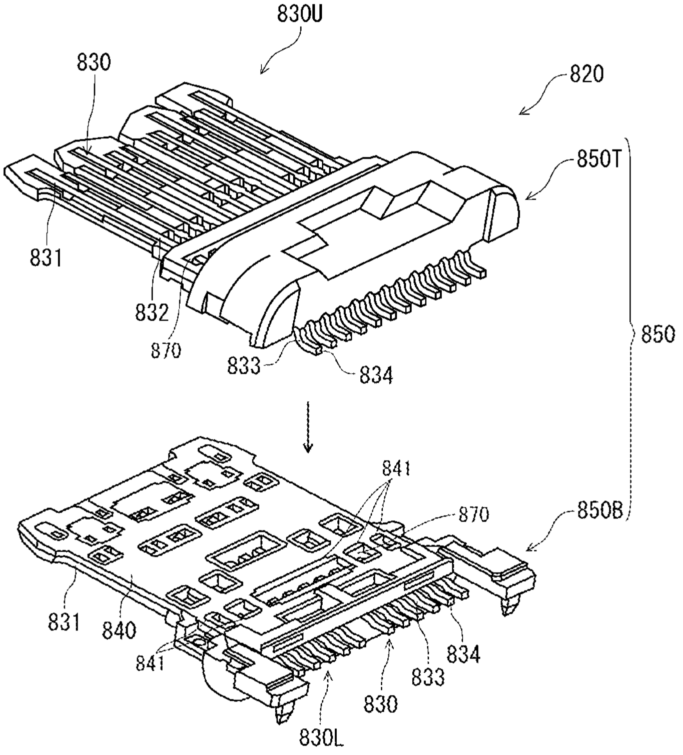
Prior Art Fig. 2
FIG. 2 is an exploded perspective view of a housing of the electrical connector shown in FIG. 1.
Figure 3:
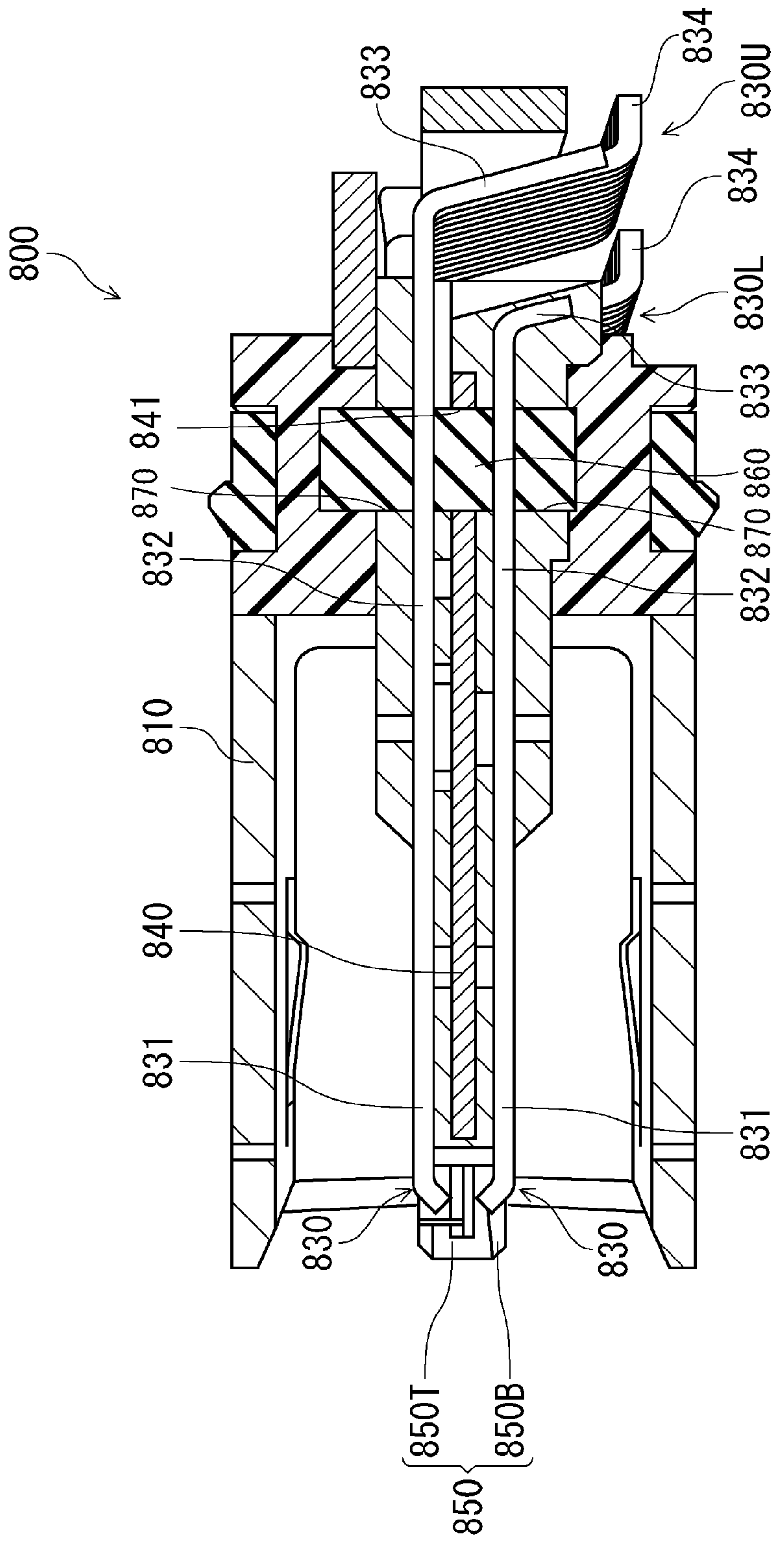
Prior Art Fig. 3
FIG. 3 is a sectional view of the electrical connector shown in FIG. 1 taken along an A-A line in FIG. 1.

Hereinafter, description will be given to an electrical connector and an electronic device of the present disclosure based on certain embodiments shown in the accompanying drawings. In this regard, the drawings referenced in the following description are schematic views prepared for explaining the present disclosure. A dimension (such as a length, a width and a thickness) of each component shown in the drawings is not necessarily identical to an actual dimension. Further, the same reference numbers are used throughout the drawings to refer to the same or like elements. Hereinafter, a positive direction of the Z axis in the drawings is sometimes referred to as "a tip side", a negative direction of the Z axis in the drawings is sometimes referred to as "a base side", a positive direction of the Y axis in the drawings is sometimes referred to as "an upper side", a negative direction of the Y axis in the drawings is sometimes referred to as "a lower side", a positive direction of the X axis in the drawings is sometimes referred to as "a front side" and a negative direction of the X axis in the drawings is sometimes referred to as "a rear side". Further, the Z direction is sometimes referred to as "an insertion and extraction direction of a corresponding connector".

First Embodiment

Figure 4:
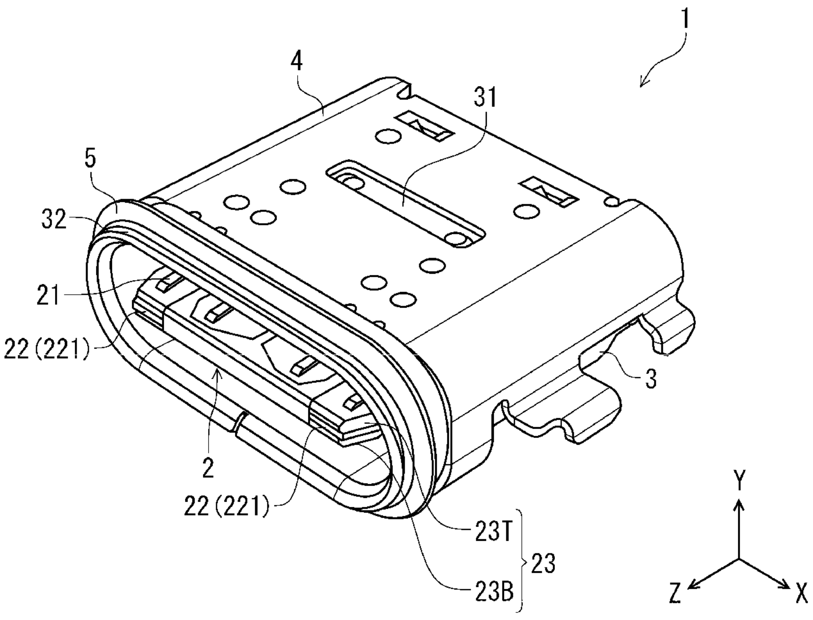
FIG. 4 is a perspective view of an electrical connector according to a first embodiment of the present disclosure.
Figure 5:
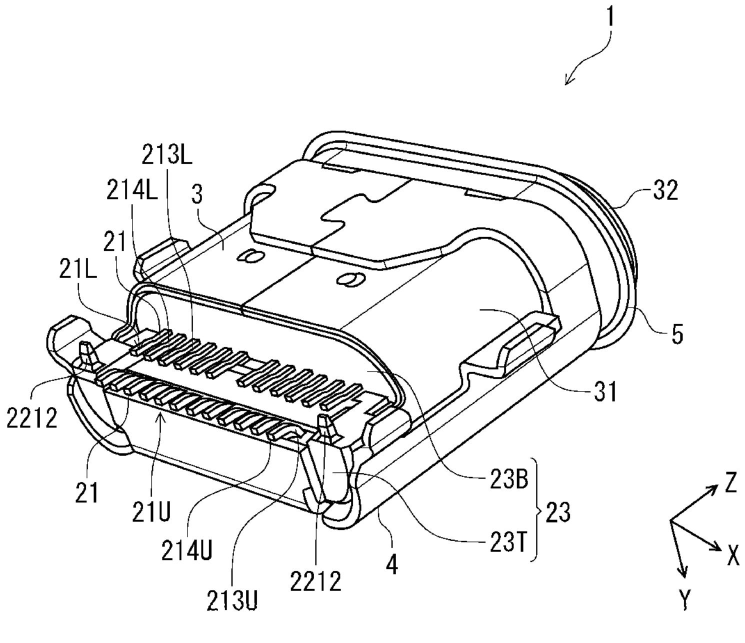
FIG. 5 is another perspective view showing the electrical connector shown in FIG. 4 from another angle.
Figure 6:
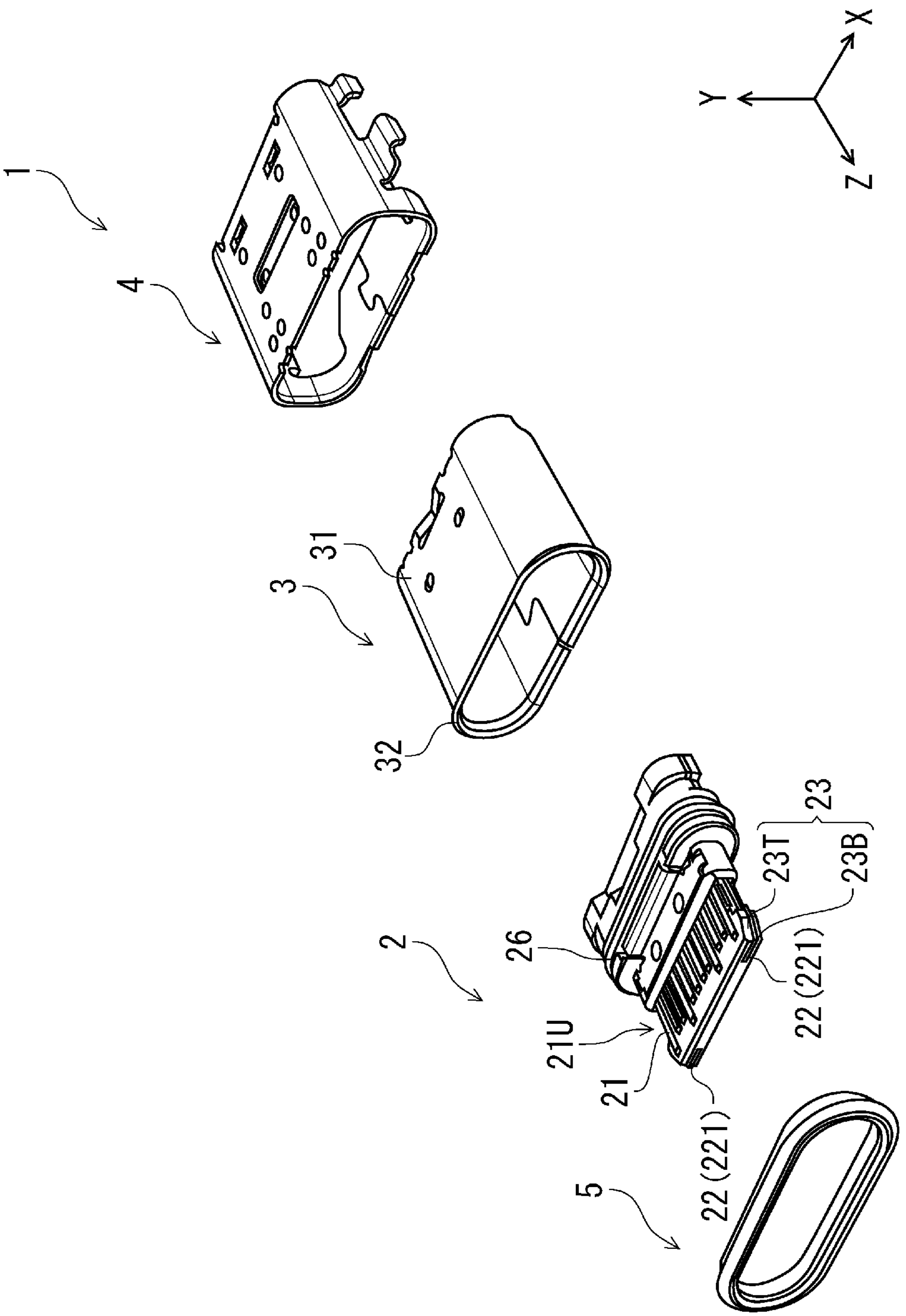
FIG. 6 is an exploded perspective view of the electrical connector shown in FIG. 4.
Figure 7:
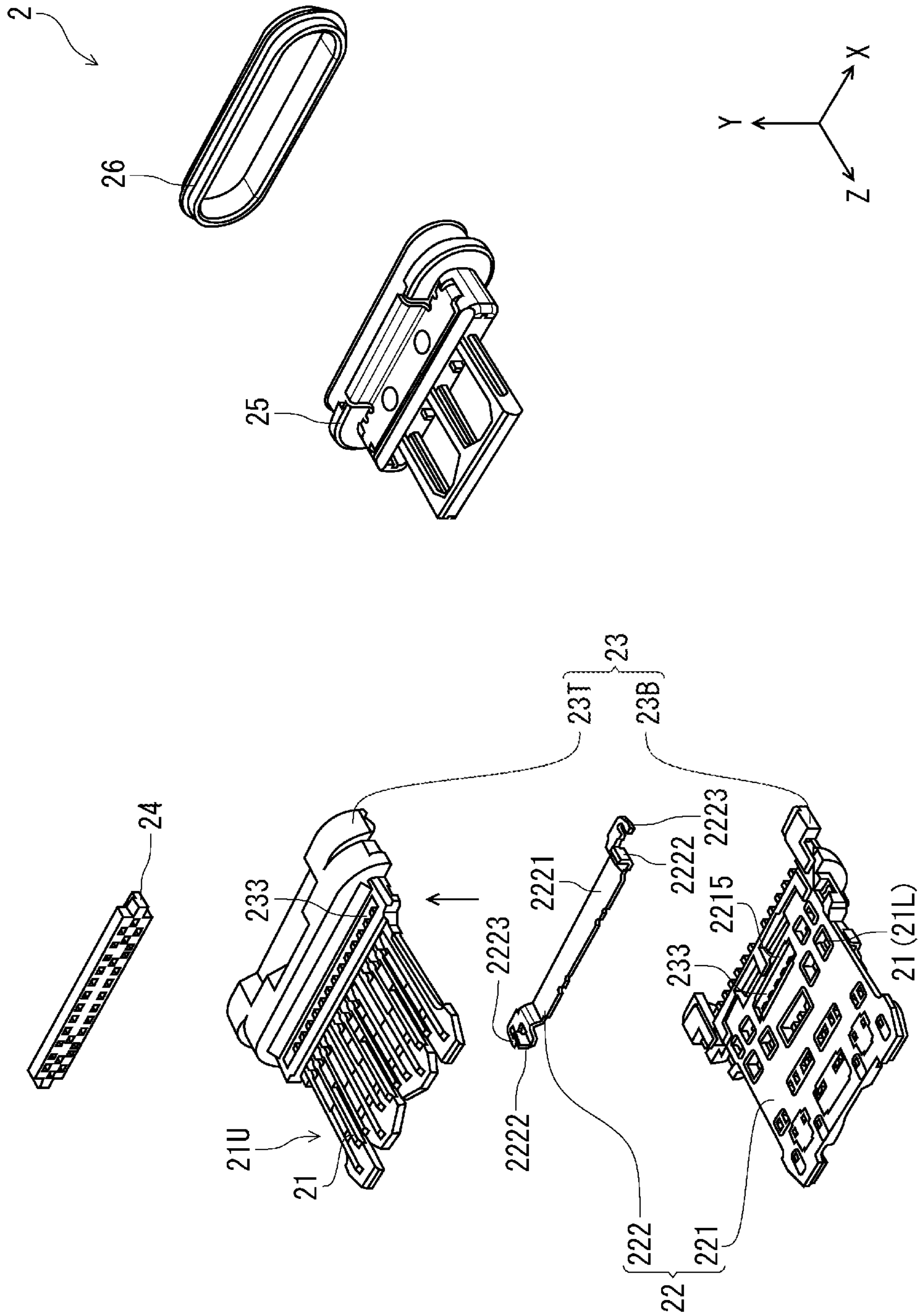
FIG. 7 is an exploded perspective view of an inner structure shown in FIG. 6.
Figure 8:
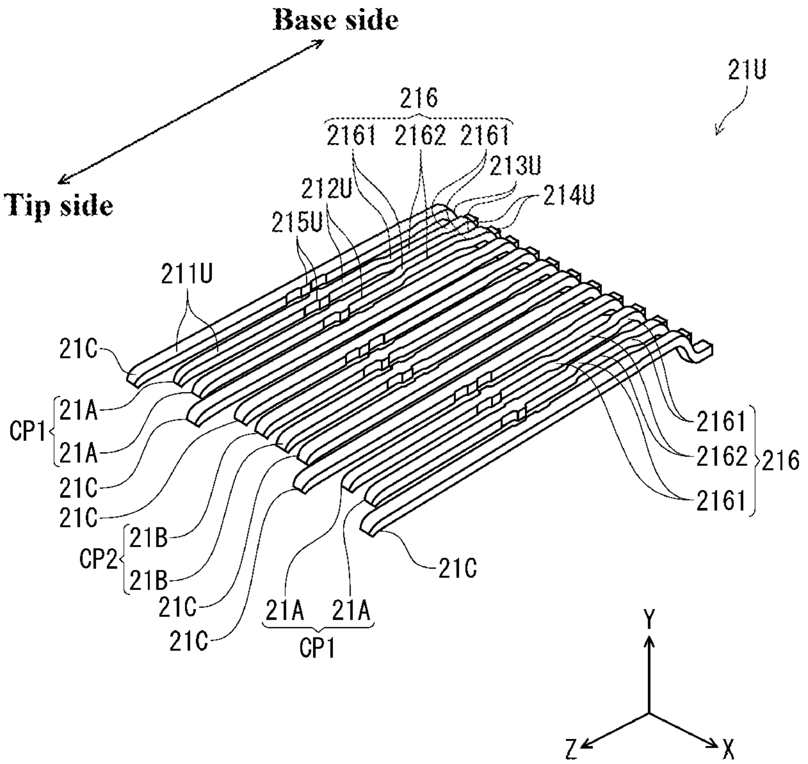
FIG. 8 is a perspective view of a first contact group of the inner structure shown in FIG. 6.
Figure 9:
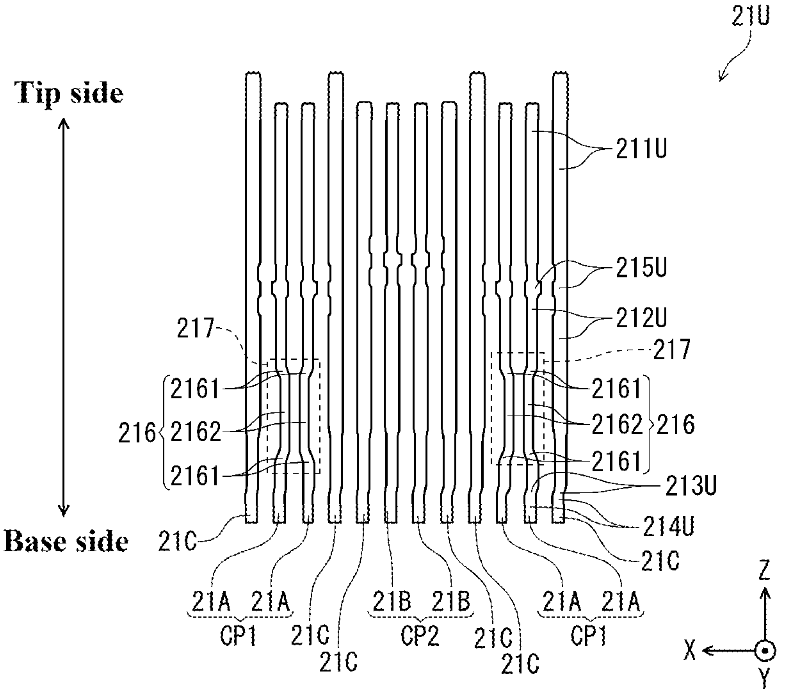
FIG. 9 is a planar view of the first contact group shown in FIG. 8.
Figure 10:
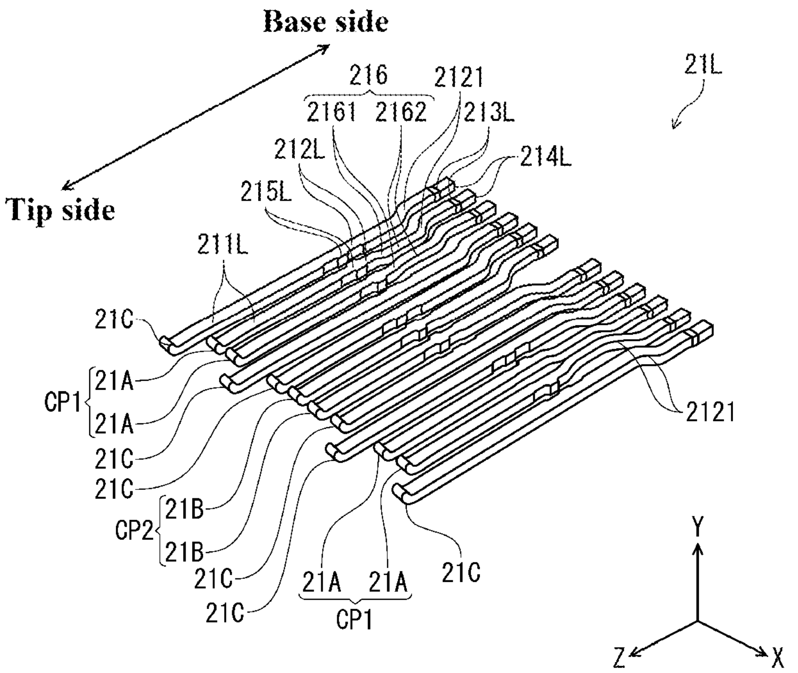
FIG. 10 is a perspective view of a second contact group of the inner structure shown in FIG. 6.
Figure 11:
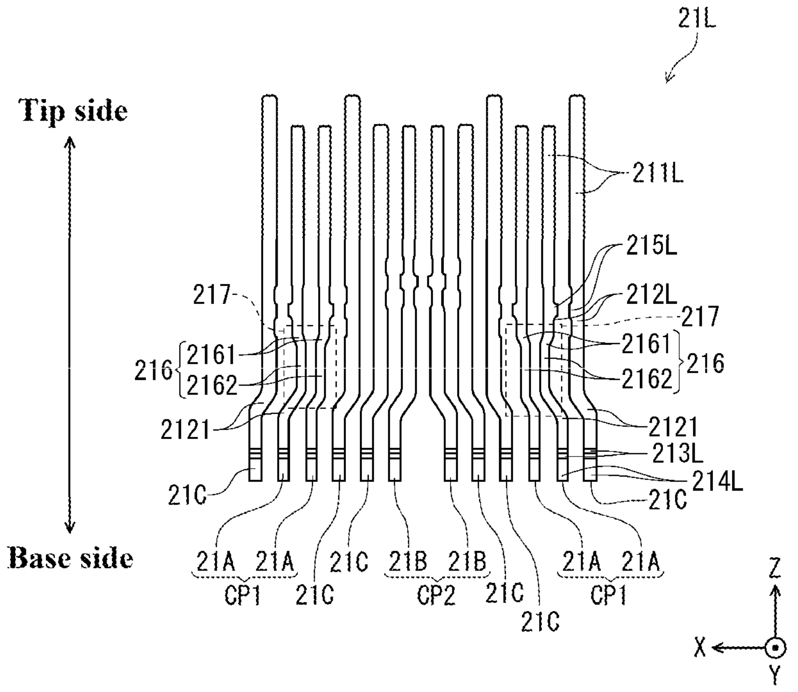
FIG. 11 is a planar view of the second contact group shown in FIG. 10.
Figure 12:
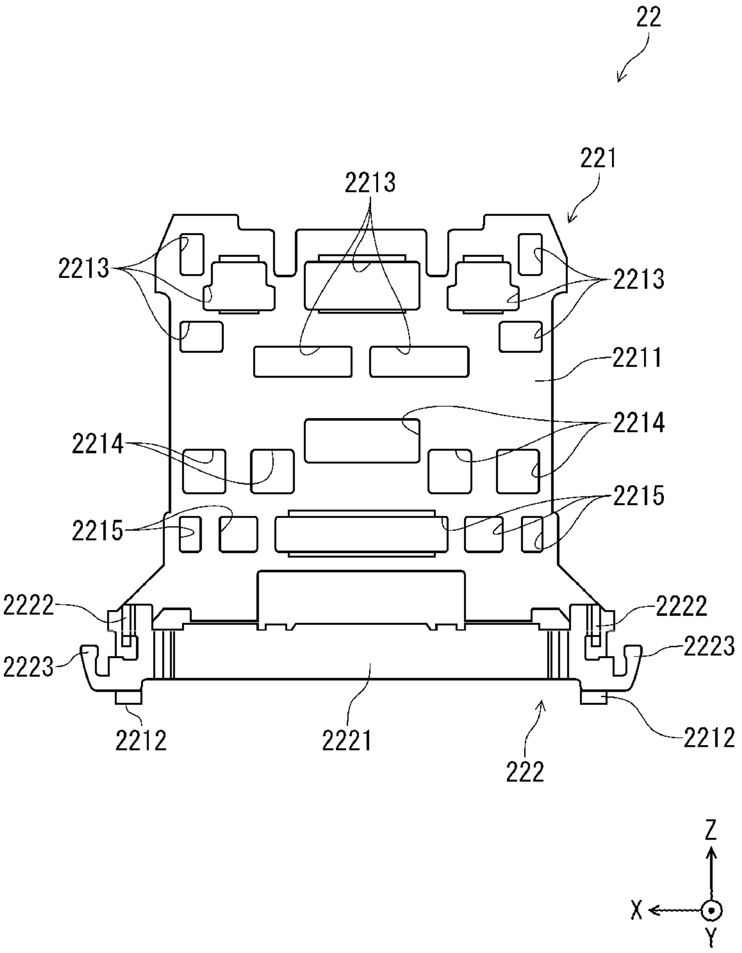
FIG. 12 is a planar view of a ground plate of the inner structure shown in FIG. 6.
Figure 13:
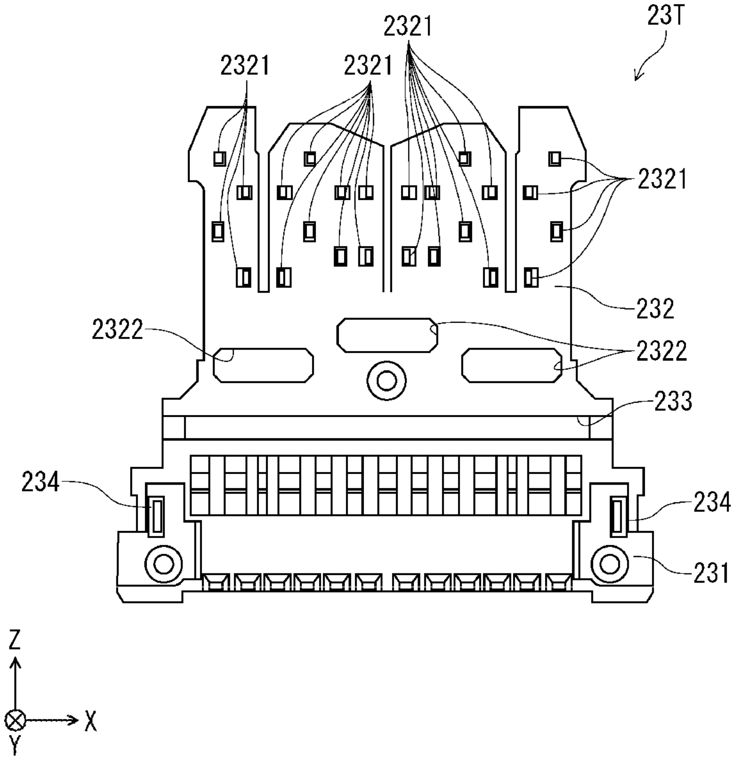
FIG. 13 is a planar view showing a lower surface of a top housing of the inner structure shown in FIG. 6.
Figure 14:
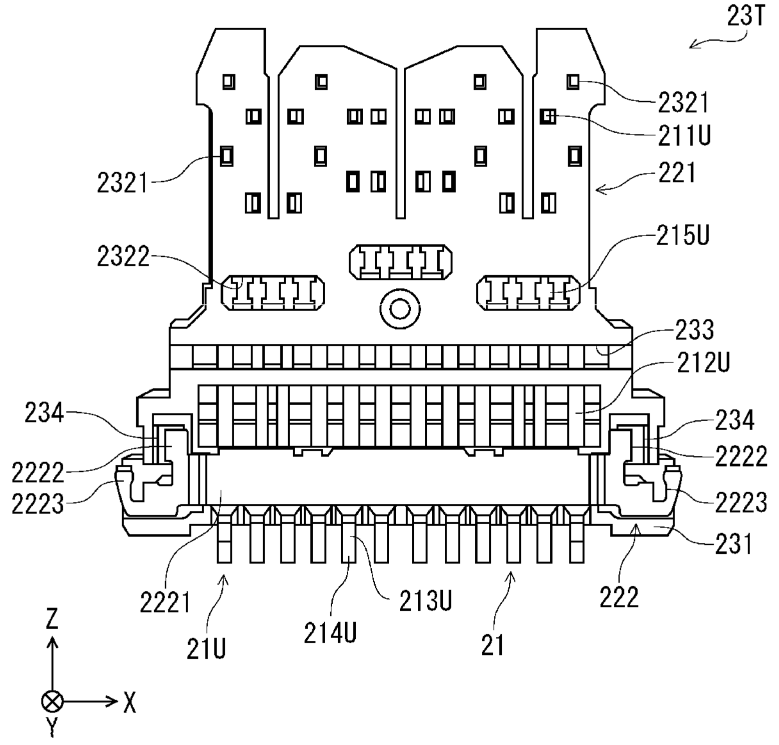
FIG. 14 is a planar view of the top housing in a state that the first contact group and a second ground plate piece are held by the top housing shown in FIG. 13.
Figure 15:
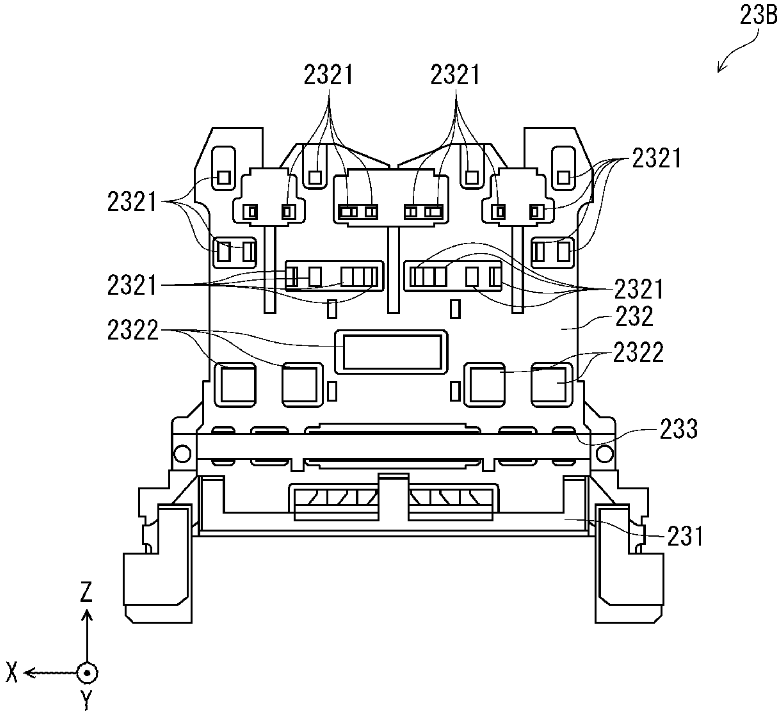
FIG. 15 is a planar view showing an upper surface of a bottom housing of the inner structure shown in FIG. 6.
Figure 16:
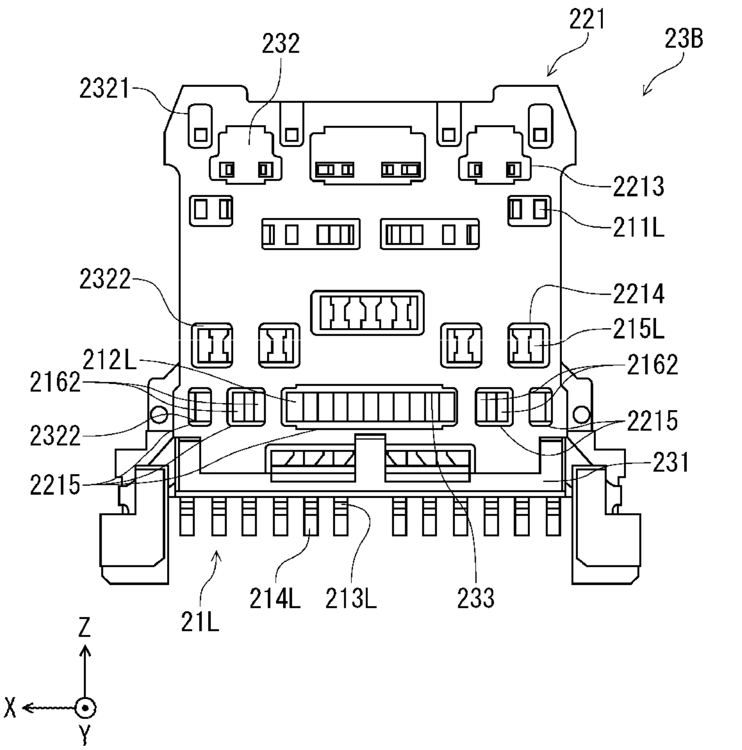
FIG. 16 is a planar view of the bottom housing in a state that the second contact group and a first ground plate piece are held by the bottom housing shown in FIG. 15.
Figure 17:
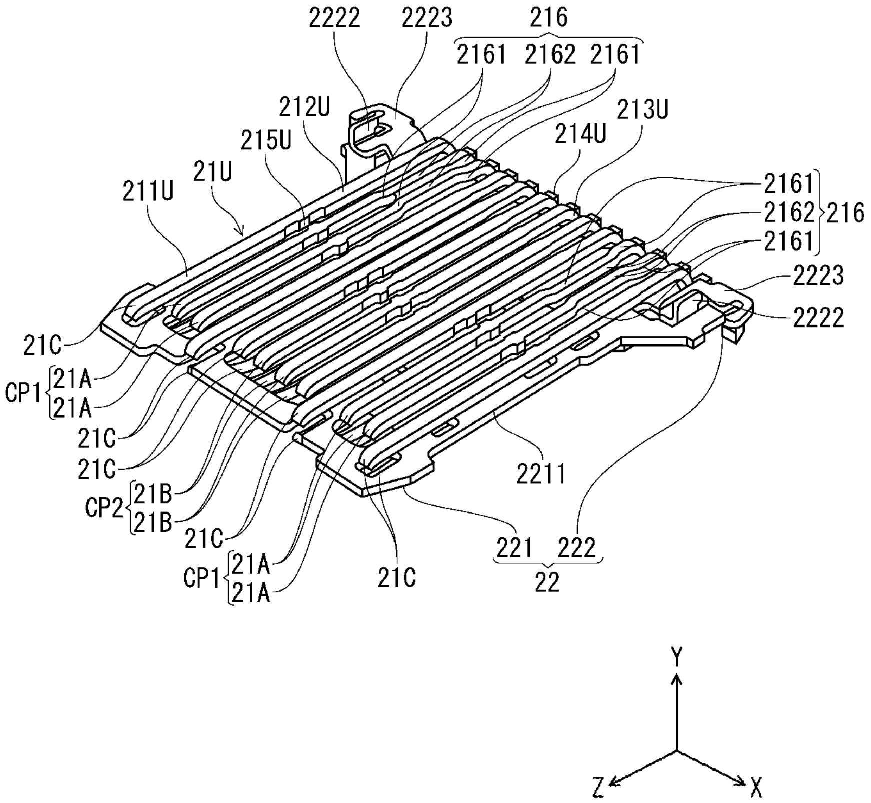
FIG. 17 is a perspective view for illustrating a positional relationship among the first contact group, the second contact group, the first ground plate piece and the second ground plate piece in a state that the inner structure shown in FIG. 6 is formed.
Figure 18:
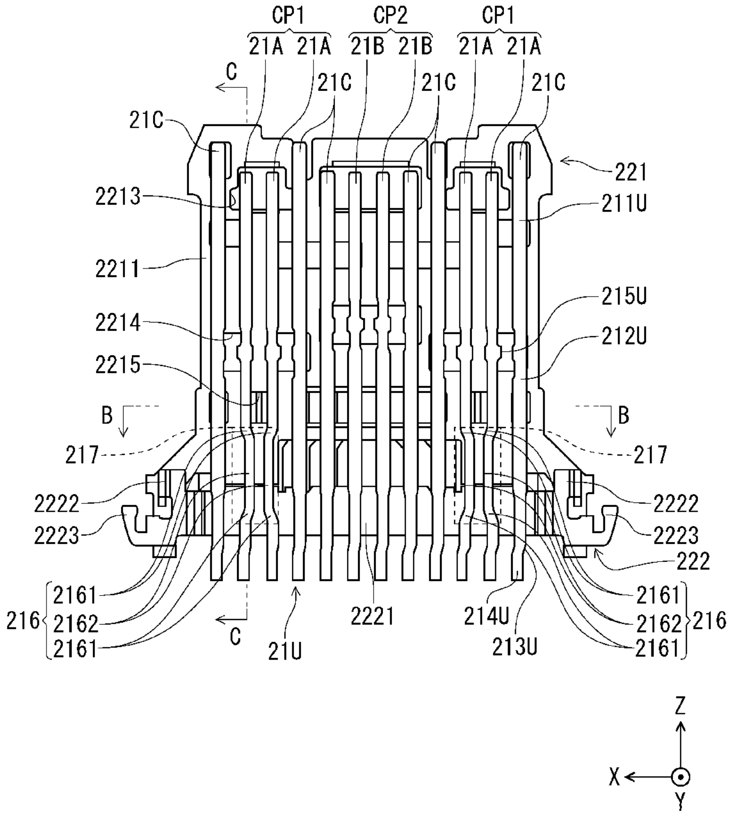
FIG. 18 is a planar view showing the perspective view of FIG. 17 viewed from an upper side.
Figure 19:
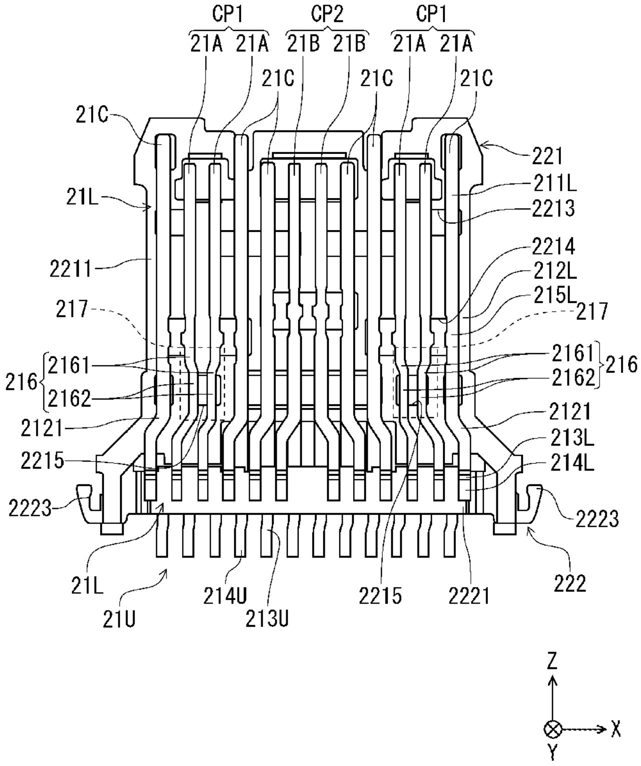
FIG. 19 is a planar view showing the perspective view of FIG. 17 viewed from a lower side.
Figure 20:
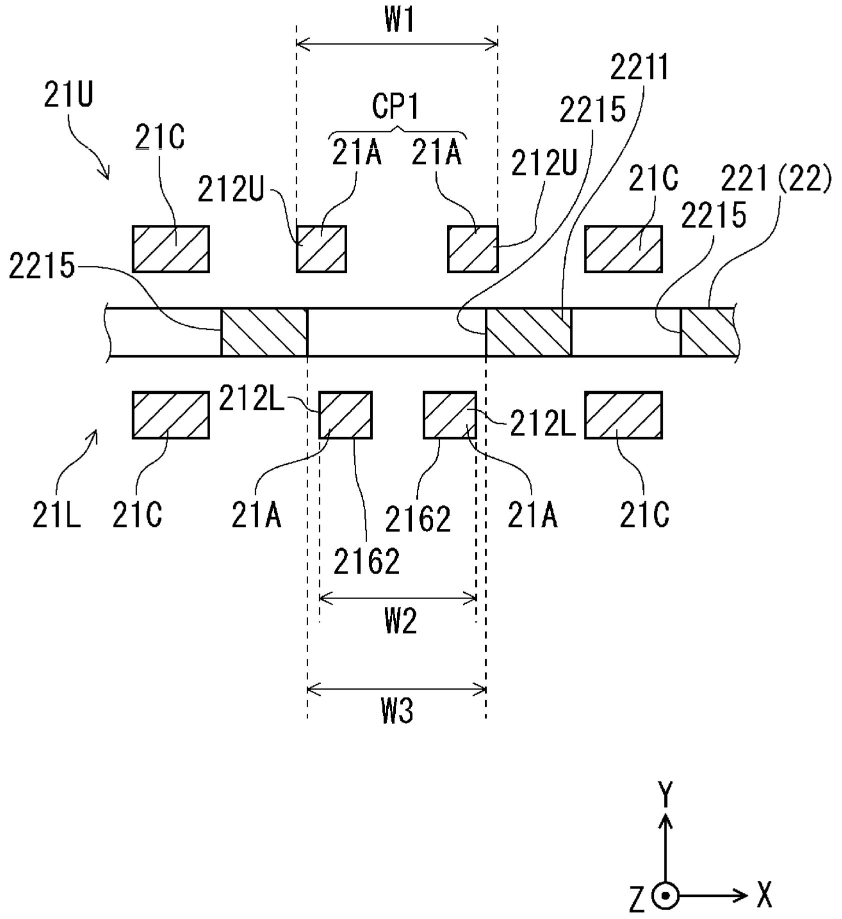
FIG. 20 is a partially enlarged view of a cross-sectional view taken along a B-B line in FIG. 18, which is referred for explaining a relationship between a separation distance of a high frequency contact pair of each of the first contact group and the second contact group and a width of a flow opening formed in the ground plate.
Figure 21:
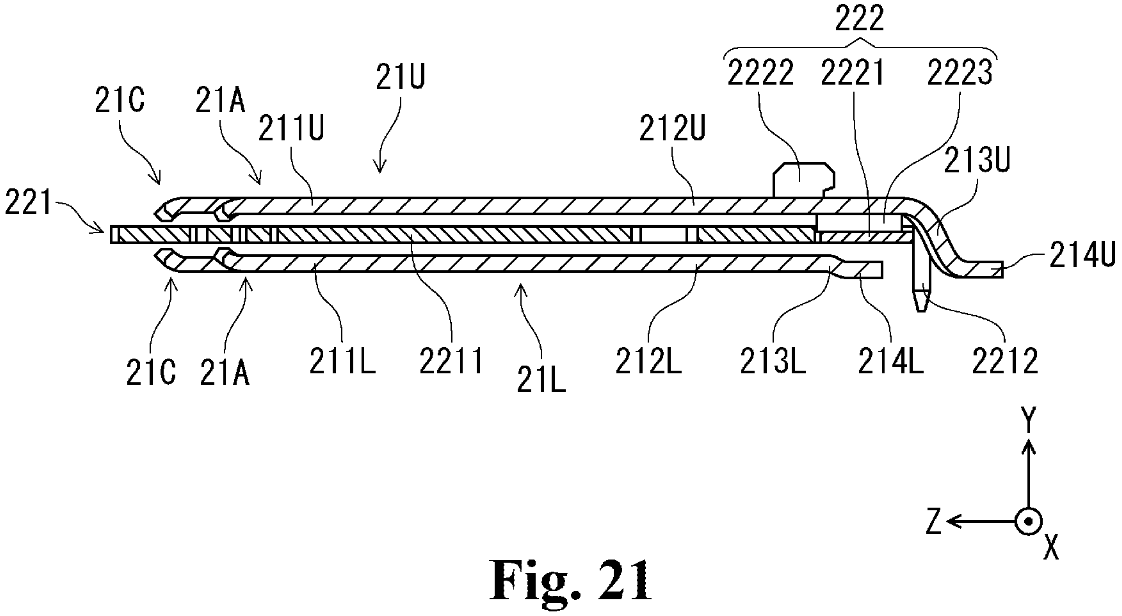
FIG. 21 is a cross-sectional view taken along a C-C line in FIG. 18.
Figure 22:
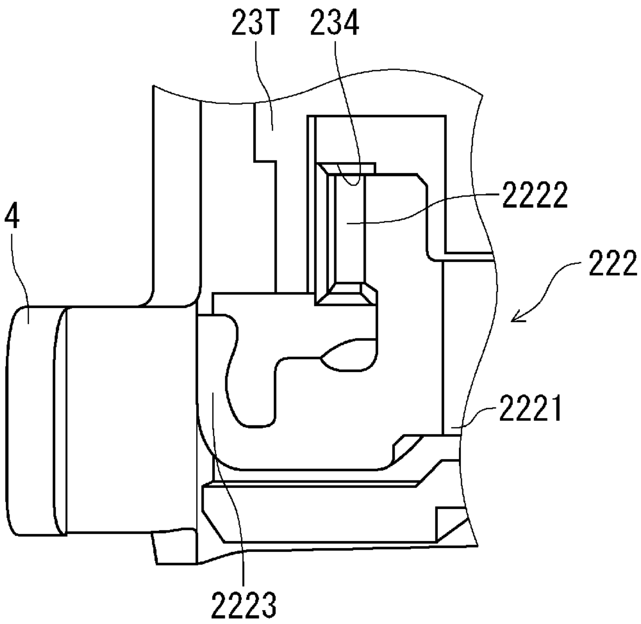
FIG. 22 is a partially enlarged view for showing contact between the second ground plate piece and a shield member.
Figure 23:
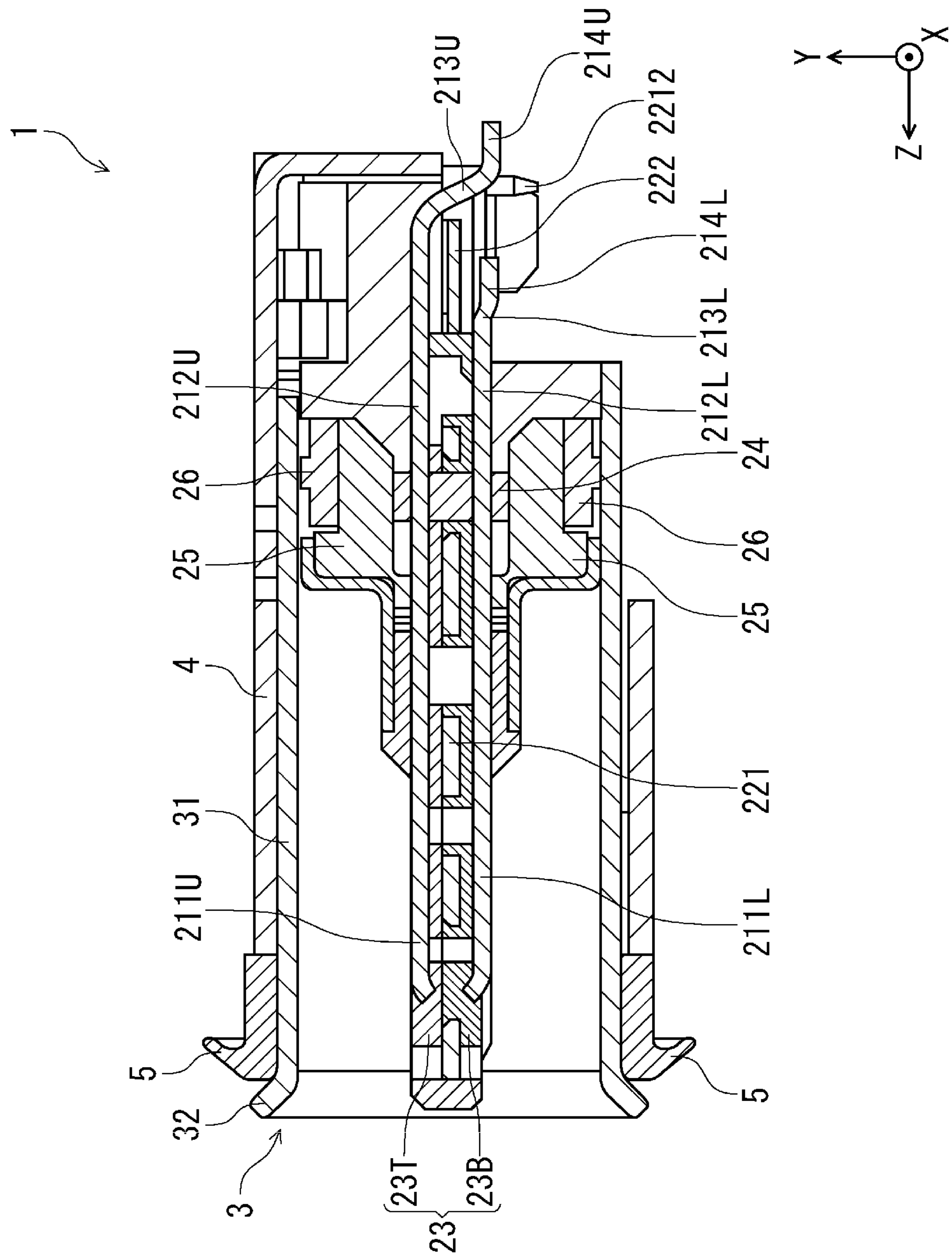
FIG. 23 is a cross-sectional view of the electrical connector shown in FIG. 4 in a Y-Z plane.

First, an electrical connector according to a first embodiment of the present disclosure will be described in detail with reference to FIGS. 4 to 23. FIG. 4 is a perspective view of the electrical connector according to the first embodiment of the present disclosure. FIG. 5 is another perspective view showing the electrical connector shown in FIG. 4 from another angle. FIG. 6 is an exploded perspective view of the electrical connector shown in FIG. 4. FIG. 7 is an exploded perspective view of an inner structure shown in FIG. 6. FIG. 8 is a perspective view of a first contact group of the inner structure shown in FIG. 6. FIG. 9 is a planar view of the first contact group shown in FIG. 8. FIG. 10 is a perspective view of a second contact group of the inner structure shown in FIG. 6. FIG. 11 is a planar view of the second contact group shown in FIG. 10. FIG. 12 is a planar view of a ground plate of the inner structure shown in FIG. 6. FIG. 13 is a planar view showing a lower surface of a top housing of the inner structure shown in FIG. 6. FIG. 14 is a planar view of the top housing in a state that the first contact group and a second ground plate piece are held by the top housing shown in FIG. 13. FIG. 15 is a planar view showing an upper surface of a bottom housing of the inner structure shown in FIG. 6. FIG. 16 is a planar view of the bottom housing in a state that the second contact group and the first ground plate piece are held by the bottom housing shown in FIG. 15. FIG. 17 is a perspective view for illustrating a positional relationship among the first contact group, the second contact group, the first ground plate piece and the second ground plate piece in a state that the inner structure shown in FIG. 6 are formed. FIG. 18 is a planar view showing the perspective view of FIG. 17 viewed from an upper side. FIG. 19 is a planar view showing the perspective view of FIG. 17 viewed from a lower side. FIG. 20 is a partially enlarged view of a cross-sectional view taken along a B-B line in FIG. 18, which is referred for explaining a relationship between a separation distance of a high frequency contact pair of each of the first contact group and the second contact group and a width of a flow opening formed in the ground plate. FIG. 21 is a cross-sectional view taken along a C-C line in FIG. 18. FIG. 22 is a partially enlarged view for showing contact between the second ground plate piece and a shield member. FIG. 23 is a cross-sectional view of the electrical connector shown in FIG. 4 in a Y-Z plane.

An electrical connector 1 according to the first embodiment of the present disclosure shown in FIG. 4 is an electrical connector with a waterproofing function which has been subjected to a waterproofing treatment. Further, the electrical connector 1 is configured to conform to specifications defined by the USB Type-C standard. For example, the electrical connector 1 is implemented as a receptacle connector to be mounted on a circuit board provided in a housing (not shown) of an electronic device such as a cellular phone, a smartphone, a personal digital assistant, a portable music player, an electronic book reader or the like. A corresponding connector (a plug connector) is inserted from a tip side of the electrical connector 1 (+Z direction side) into the electrical connector 1 to provide an electrical connection between the corresponding connector and the electrical connector 1.

The electrical connector 1 of the present disclosure is configured to conform to the specifications defined by the USB Type-C standard. Thus, the electrical connector 1 contains a first contact group 21U and a second contact group 21L which are arranged respectively on an upper surface and a lower surface of an insulating housing 23 and symmetrically faces in the vertical direction through a ground plate 22. The electrical connector 1 has various features for suppressing crosstalk between contacts 21 of the first contact group 21U and contacts 21 of the second contact group 21L. In particular, the electrical connector 1 of the present disclosure is configured so that the ground plate 22 is further located in an area where a metal member such as a ground plate is not located in the prior art. Thus, it is possible to effectively suppress the crosstalk between the contacts 21 of the first contact group 21U and the contacts 21 of the second contact group 21L.

Further, in the electrical connector 1 of the present disclosure, each of two high frequency signal contacts 21A constituting either one of two high frequency signal contact pairs CP1 contained in each of the first contact group 21U and the second contact group 21L has a narrow pitch portion 216 approaching from one of the two high frequency signal contacts 21A toward the other one of the two high frequency signal contacts 21A and a narrow pitch section 217 is formed by the narrow pitch portions 216 of the two high frequency signal contacts 21A as shown in FIGS. 8 and 10. Although the reason is described later, it is possible to suppress crosstalk due to the two high frequency signal contacts 21A in the narrow pitch section 217 by forming the narrow pitch portion 216 in each of the two high frequency signal contacts 21A.

Further, in the electrical connector 1 of the present disclosure, the ground plate 22 has flow openings 2215 each facing the two high frequency signal contacts 21A constituting the high frequency signal contact pairs CP1 of the first contact group 21U and the second contact group 21L (see FIGS. 8 and 10) as shown in FIG. 12. Even in this case, the electrical connector 1 of the present disclosure is configured to suppress crosstalk between the upper and lower high frequency signal contacts 21A in areas where the flow openings 2215 of the ground plate 22 are formed.

As shown in FIG. 6, the electrical connector 1 contains an inner structure 2, a metal shell 3 covering the inner structure 2 from the outside of the inner structure 2, a shield member 4 covering the shell 3 from the outside of the shell 3 and an outer waterproof sealing member 5 attached to a tip end portion of an outer periphery of a body portion 31 of the shell 3 and held between a locking portion 32 of the shell 3 and the shield member 4.

As shown in FIG. 7, the inner structure 2 contains the first contact group 21U constituted of a plurality of contacts 21 arranged on a first contact plane, the second contact group 21L constituted of a plurality of contacts 21 arranged on a second contact plane facing the first contact plane, the ground plate 22 located on a ground plane facing the first contact plane and the second contact plane between the first contact plane and the second contact plane, the insulating housing 23 holding the first contact group 21U, the second contact group 21L and the ground plate 22, a waterproof sealing portion 24 which closely contacts with each of the contacts 21 of the first contact group 21U and the second contact group 21L in the housing 23 to liquid-tightly seal an inside of the housing 23, an outer mold 25 formed on an outside of the housing 23 and an inner waterproof sealing member 26 attached to an outer periphery of the outer mold 25.

FIG. 8 shows the perspective view of the first contact group 21U and FIG. 9 shows the planar view of the first contact group 21U viewed from the upper side. The first contact group 21U is constituted of the plurality of contacts 21 (the twelve contacts 21 in the illustrated embodiment) arranged on the first contact plane located on the upper side (on the +Y direction side) of the ground plane on which the ground plate 22 is arranged. The contacts 21 of the first contact group 21U are arranged on the first contact plane so as to be parallel to each other along the X axis direction and held so as to be spaced apart and insulated from each other on an upper surface of a top housing 23T of the housing 23 (see FIGS. 6 and 7).

Each of the plurality of contacts 21 has a rod-like shape linearly extending along the Z axis direction. Each of the plurality of contacts 21 of the first contact group 21U has a contacting portion 211U located on the tip side (the +Z direction side) and to be contacted with a corresponding contact of the corresponding connector, a horizontally extending portion 212U which horizontally extends from the contacting portion 211U toward the base side (the −Z direction side), a downwardly extending portion 213U which downwardly extends from the horizontally extending portion 212U, a terminal portion 214U which extends from the downwardly extending portion 213U toward the base side and a tie-bar cut mark 215U which is formed by punching a connecting portion with tie-bar cut method. The connecting portion had connected the plurality of contacts 21 of the first contact group 21U with each other at the time when the top housing 23T is insert-molded.

The contacting portion 211U of each of the contacts 21 of the first contact group 21U contacts with the corresponding contact of the corresponding connector when the corresponding connector is inserted into the electrical connector 1 from the tip side through a tip side opening of the shell 3 in a state that the electrical connector 1 is assembled. At this time, the corresponding connector and the electrical connector 1 take an engaged state to provide the electrical connection between the corresponding connector and the electrical connector 1. The horizontally extending portion 212U of each of the contacts 21 of the first contact group 21U horizontally extends from a base end of the contacting portion 211U toward the base side (the −Z direction side). The horizontally extending portion 212U is embedded in the top housing 23T and thus the contact 21 is fixedly held by the top housing 23T. The contacting portion 211U and the horizontally extending portion 212U are located on the first contact plane.

The downwardly extending portion 213U of each of the contacts 21 of the first contact group 21U extends downwardly (in the −Y direction) from a base end of the horizontally extending portion 212U. As shown in FIG. 5, base end portions of the downwardly extending portions 213U of the plurality of contacts 21 of the first contact group 21U are exposed to the outside from the base side of the top housing 23T. Returning back to FIG. 8, the terminal portion 214U of each of the contacts 21 horizontally extends toward the base side (on the −Z direction side) from a base end portion of each of the downwardly extending portions 213U exposed to the outside from the base side of the top housing 23T. The terminal portions 214U of the first contact group 21U should be connected to the circuit board of the electronic device.

The tie-bar cut mark 215U of each of the contacts 21 of the first contact group 21U is formed by the tie-bar cutting method performed after the top housing 23T has been insert-molded. At the time of insert-molding the top housing 23T, the plurality of contacts 21 are connected to each other by the connecting portions in order to prevent a positional shift and an inclination of the plurality of contacts 21 of the first contact group 21U in the top housing 23T. Thus, after the top housing 23T has been insert-molded, the tie-bar cut method is performed to punch the connecting portions connecting the plurality of contacts 21 of the first contact group 21U with each other and separate the plurality of contacts 21 from each other. The tie-bar cut mark 215U of each of the contacts 21 of the first contact group 21U is a remaining portion of the connecting portion punched by the tie-bar cut method.

Further, the plurality of contacts 21 constituting the first contact group 21U contain two high frequency signal contact pairs CP1 each constituted of two high frequency signal contacts 21A for transmitting a high frequency differential signal with respect to the corresponding connector, a normal signal contact pair CP2 constituted of two normal signal contacts 21B for transmitting a normal frequency differential signal with respect to the corresponding connector and a plurality of non-signal contacts 21C used for some purposes other than signal transmission.

Each of the two high frequency signal contact pairs CP1 is constituted of the two high frequency signal contacts 21A which are adjacent to each other. The two high frequency signal contact pairs CP1 are respectively located on both sides in a width direction of the electrical connector 1 (in the X axis direction in the figure). Furthermore, the non-signal contacts 21C are respectively arranged on both sides of each of the two high frequency signal contact pairs CP1. In FIGS. 8 and 9, each of the non-signal contacts 21C arranged on the outer sides of the two high frequency signal contact pairs CP1 is a ground terminal to be contacted with a ground terminal of the corresponding connector. On the other hand, each of the non-signal contacts 21C arranged on the inner sides of the two high frequency signal contact pairs CP1 is a power supply terminal for supplying electric power to the electrical connector 1.

The normal signal contact pair CP2 is constituted of the two normal signal contacts 21B for transmitting the normal frequency differential signal with respect to the corresponding connector. The normal signal contact pair CP2 is arranged between the two high frequency signal contact pairs CP1. In addition, the non-signal contacts 21C are respectively arranged on both sides of the normal signal contact pair CP2. Each of the non-signal contacts 21C respectively arranged on both sides of the normal signal contact pair CP2 is an identification contact used for transmitting signals for identifying the electrical connector 1.

As described above, the first contact group 21U contains some kinds of contacts 21 used for various purposes. According to the USB Type-C standard, a separation distance (pitch) between the contacting portions 211U of the plurality of contacts 21 must be equal to each other (must be an equal pitch). Further, a pitch length of each of the contacting portions 211U of the plurality of contacts 21 is also strictly determined by the USB Type-C standard. Furthermore, a separation distance between the terminal portions 214U of the plurality of contacts 21 is appropriately set from viewpoints of execution accuracy of connections (for example, soldering connections) with respect to the circuit board of the electronic device, prevention of short-circuiting between the contacts 21 and the like.

The two adjacent high frequency signal contacts 21A constituting the high frequency signal contact pair CP1 are used for transmitting the high frequency differential signal. Thus, high frequency signals directed in opposite directions respectively flows in the two adjacent high frequency signal contacts 21A. As is well known in the electromagnetic field, a direction of a noise caused by a current flowing in a conductor depends on a direction of the current flowing in the conductor. Thus, when a pair of conductors in which currents respectively flow in the opposite directions is arranged so as to be close to each other, influences against other contacts 21 due to noises caused by the currents respectively flowing in the pair of conductors cancel each other.

As shown in FIG. 9, in the electrical connector 1 of the present disclosure, each of the two high frequency signal contacts 21A constituting each of the two high frequency signal contact pairs CP1 among the plurality of contacts 21 constituting the first contact group 21U has the narrow pitch portion 216 approaching from one of the two high frequency signal contacts 21A toward the other one of the two high frequency signal contacts 21A. The narrow pitch section 217 is formed by the narrow pitch portions 216 of the two high frequency signal contacts 21A.

The narrow pitch portion 216 of each of the two high frequency signal contacts 21A has two approaching portions 2161 approaching from one of the two high frequency signal contacts 21A toward the other one of the two high frequency signal contacts 21A and a straight portion 2162 horizontally extending between the two approaching portions 2161 in an extension direction of the high frequency signal contact 21A (which is equivalent to the insertion and extraction direction of the corresponding connector, that is the Z direction).

As described above, the separation distance (the pitch) between the contacting portions 211U of the two high frequency signal contacts 21A is determined by the USB Type-C standard and the separation distance between the terminal portions 214U is appropriately set from the viewpoints of the execution accuracy of the connections (for example, the soldering connections) with respect to the circuit board of the electronic device, the prevention of short-circuiting between the contacts 21 and the like. Thus, the narrow pitch section 217 cannot be formed in the contacting portion 211U and/or the terminal portion 214U as long as the electrical connector 1 conforms to the USB Type-C standard. Therefore, in the electrical connector 1 of the present embodiment, the narrow pitch section 217 is formed in the horizontally extending portion 212U because there is no limitation with respect to the horizontally extending portion 212U from the viewpoints of conforming to the standard of USB Type-C, the execution accuracy and the prevention of short-circuiting between the contacts 21 and the like and thus there is freedom in design for the horizontally extending portion 212U.

In the narrow pitch section 217, a separation distance between the straight portions 2162 of the narrow pitch portions 216 of the two high frequency signal contacts 21A is smaller than a separation distance between other portions of the two high frequency signal contacts 21A. As described above, the high frequency differential signal, i.e., the currents flowing in the opposite directions respectively flows in the two high frequency signal contacts 21A constituting the high frequency signal contact pair CP1. Thus, directions of the noises caused by the currents respectively flowing in the two high frequency signal contacts 21A are different from each other. Therefore, influences of the noises against the other contacts 21 cancel each other. In particular, the separation distance between the straight portions 2162 of the narrow pitch portions 216 is smaller than the separation distance between the other portions. Thus, in the narrow pitch section 217, the influences of the noises caused by the currents respectively flowing in the two high frequency signal contacts 21A (differential signal) against the other contacts 21 cancel each other. Therefore, in the narrow pitch section 217, the influences of the noises caused by the currents (the differential signal) respectively flowing in the two high frequency signal contacts 21A against the other contacts 21 become smaller than influences of noises caused by the currents flowing in the other portions against the other contacts 21.

As is well known, crosstalk between two contacts 21 arranged so as to be spaced apart from each other (for example, the contact 21 of the first contact group 21U and the contact 21 of the second contact group 21L which are arranged so as to be spaced apart from each other in the vertical direction) is caused from a fact that a current flowing in one of the two contacts 21 affects the other one of the two contacts 21 and thus a current is generated in the other one of the two contacts 21 by an electromagnetic induction. Therefore, in order to suppress the crosstalk between the two contacts 21, it is useful to absorb or reduce the influence of the current flowing in one of the two contacts 21.

In the narrow pitch section 217, the separation distance between the straight portions 2162 of the narrow pitch portions 216 of the two high frequency signal contacts 21A is smaller than the separation distance between the other portions of the two high frequency signal contacts 21A. Thus, the influences of the noises caused by the currents (the differential signal) respectively flowing in the two high frequency signal contacts 21A against the other contacts 21 cancel each other. Therefore, it is possible to suppress the crosstalk due to the high frequency signal contacts 21A in the narrow pitch section 217.

Further, as is clear from FIG. 9, a separation distance between the straight portion 2162 of the narrow pitch portion 216 of the high frequency signal contact 21A and the horizontally extending portion 212U of the adjacent non-signal contact 21C is larger than a separation distance between the other portion of the high frequency signal contact 21A and the horizontal extending portion 212U of the adjacent non-signal contact 21C in the narrow pitch section 217. The separation distance between the straight portions 2162 of the narrow pitch portions 216 of the two high frequency signal contacts 21A is as small as possible from the viewpoint of suppressing the crosstalk. However, if the separation distance between the straight portions 2162 of the narrow pitch portions 216 of the two high frequency signal contacts 21A is too small, there are demerits such as an increase in a risk of occurrence of an electrical short (short circuit) between the two high frequency signal contacts 21A, a change in an impedance of each of the high frequency signal contacts 21A, an increase in reflection and insertion loss of the high frequency signal contacts 21A and the like. Thus, the separation distance between the straight portions 2162 of the narrow pitch portions 216 of the two high frequency signal contacts 21A is appropriately set with taking into account a plurality of factors containing these demerits so as to make the electrical characteristics of the electrical connector 1 most useful. However, although it depends on an overall size of the electrical connector 1 and a design balance of the electrical connector 1 such as a width, a length and a thickness of each contact 21, the separation distance between the straight portions 2162 of the narrow pitch portions 216 of the two high frequency signal contacts 21A may be equal to or larger than 1.5 times a width (length in the X direction) of the high frequency signal contact 21A or equal to or larger than 1.0 times the width of the high frequency signal contact 21A in order to substantially obtain the crosstalk suppressing effect by the narrow pitch section 217.

Similarly, a length (length in the Z direction) of the straight portion 2162 of the narrow pitch portion 216 of each of the two high frequency signal contacts 21A is as long as possible from the viewpoint of suppressing the crosstalk. However, the length of the straight portion 2162 is appropriately set because a length of the contacting portion 211U (a length in the Z-direction) is determined by the USB Type-C standard and a length of the entire electrical connector 1 is limited in order to mount the electrical connector 1 within the electronic device. However, although it depends on the overall size of the electrical connector 1 and the design balance of the electrical connector 1 such as the width, the length and the thickness of each contact 21, the length of the straight portion 2162 may be equal to or larger than twice the width (the length in the X direction) of the high frequency signal contact 21A or equal to or larger than five times the width of the high frequency signal contact 21A in order to substantially obtain the crosstalk suppressing effect by the narrow pitch section 217.

As described above, in the electrical connector 1 of the present disclosure, each of the two adjacent high frequency signal contacts 21A constituting the high frequency signal contact pair CP1 has the narrow pitch portion 216 approaching from one of the two high frequency signal contacts 21A toward the other one of the two high frequency signal contacts 21A and the narrow pitch section 217 is formed by the narrow pitch portions 216 of the two high frequency signal contacts 21A. Therefore, it is possible to effectively suppress the crosstalk due to the high frequency signal contacts 21A in the narrow pitch section 217.

As is well known, the influence of the crosstalk becomes large as the frequency of the signal flowing in the contact 21 increases. Therefore, in the electrical connector 1 of the present disclosure, each of the high frequency signal contacts 21A in which the high frequency differential signal flows has the narrow pitch portion 216 approaching from one of the two high frequency signal contacts 21A toward the other one of the two high frequency signal contacts 21A and the narrow pitch section 217 is formed by the narrow pitch portions 216 of the two high frequency signal contacts 21A. Thus, it is possible to suppress the crosstalk between the plurality of contacts 21 more effectively than a case of providing the narrow pitch portions 216 at the two adjacent contacts 21 other than the two adjacent high frequency signal contacts 21A. Although each of the normal signal contacts 21B does not have such narrow pitch portion 216 in the illustrated embodiment, the present disclosure is not limited thereto. For example, an aspect in which each of the normal signal contacts 21B has such narrow pitch portion 216 as is the case with the high frequency signal contacts 21A is also involved within the scope of the present disclosure.

FIG. 10 shows the perspective view of the second contact group 21L. FIG. 11 shows the planar view of the second contact group 21L viewed from the upper side. The second contact group 21L is constituted of a plurality of contacts 21 (the twelve contacts 21 in the illustrated embodiment) arranged in the second contact plane located on the lower side (the −Y direction side) of the ground plane on which the ground plate 22 is arranged. The contacts 21 of the second contact group 21L are arranged on the second contact plane so as to be parallel to each other along the X axis direction and held on a lower surface of a bottom housing 23B (see FIGS. 6 and 7) of the housing 23 in a state that the contacts 21 are spaced apart and insulated from each other.

As shown in FIGS. 10 and 11, each of the plurality of contacts 21 of the second contact group 21L basically has the same configuration as that of each of the plurality of contacts 21 of the first contact group 21U. Namely, each of the plurality of contacts 21 of the second contact group 21L has a contacting portion 211L located on the tip side (the +Z direction side) and to be contacted with a corresponding contact of the corresponding connector, a horizontally extending portion 212L which horizontally extends from the contacting portion 211L toward the base side (the −Z direction side), a downwardly extending portion 213L which downwardly extends from the horizontally extending portion 212L, a terminal portion 214L which extends from the downwardly extending portion 213L toward the base side and a tie-bar cut mark 215L which is formed by punching a connecting portion with the tie-bar cut method. The connecting portion had connected the plurality of contacts 21 of the second contact group 21L with each other at the time when the bottom housing 23B is insert-molded.

However, a length of each of the plurality of contacts 21 of the second contact group 21L is shorter than a length of each of the plurality of contacts 21 of the first contact group 21U. Further, the horizontally extending portion 212L of each of the contacts 21 of the second contact group 21L has an outwardly extending portion 2121 outwardly extending from a center of the electrical connector 1 in the width direction (the X direction). Thus, as shown in FIG. 19, the terminal portion 214L of each of the contacts 21 of the second contact group 21L is located between the terminal portions 214U of the plurality of contacts 21 of the first contact group 21U in the planar view. Referring back to FIG. 10, an extending amount of the downwardly extending portion 213L of each of the contacts 21 of the second contact group 21L toward the lower side (the −Y direction side) is smaller than an extending amount of the downwardly extending portion 213 of each of the contacts 21 of the first contact group 21U.

Each of functions of the plurality of contacts 21 of the second contact group 21L is the same as that of each of the functions of the plurality of contacts 21 of the first contact group 21U described above. Specifically, similar to the first contact group 21U, the second contact group 21L contains two high frequency signal contact pairs CP1 each constituted of two high frequency signal contacts 21A for transmitting the high frequency differential signal with respect to the corresponding connector, a normal signal contact pair CP2 constituted of two normal signal contacts 21B for transmitting the normal frequency differential signal with respect to the corresponding connector and a plurality of non-signal contacts 21C used for the purposes other than the signal transmission. Arrangement for the high frequency signal contacts 21A, the normal signal contacts 21B and the non-signal contacts 21C is the same as that of the first contact group 21U.

Similar to the two high frequency signal contacts 21A constituting the high frequency signal contact pair CP1 of the first contact group 21U, each of the two high frequency signal contacts 21A constituting the high frequency signal contact pair CP1 of the second contact group 21L has the narrow pitch portion 216 approaching from one of the two high frequency signal contacts 21A toward the other one of the two high frequency signal contacts 21A and the narrow pitch section 217 is formed by the narrow pitch portions 216 of the two high frequency signal contacts 21A.

In this regard, since the outwardly extending portion 2121 is formed at a base side portion of the horizontally extending portion 212L of the high frequency signal contact 21A of the second contact group 21L, the narrow pitch portion 216 of the high frequency signal contact 21A of the second contact group 21L is constituted of one approaching portion 2161 and the straight portion 2162.

The first contact group 21U and the second contact group 21L are arranged so that the contacting portions 211U of the contacts 21 of the first contact group 21U and the contacting portions 211L of the contacts 21 of the second contact group 21L are vertically symmetric through the ground plate 22 when they are viewed from the front side of the electrical connector 1 (from the side of the corresponding connector).

Further, the contacting portions 211U, 211L and tip end portions of the horizontally extending portions 212U, 212L (portions located on the tip side than the outwardly extending portions 2121 of the horizontally extending portions 212L of the second contact group 21L) of the first contact group 21U and the second contact group 21L face each other through the ground plate 22. The crosstalk between the contacts 21 vertically facing each other as described above adversely affects the electrical characteristics of the electrical connector 1.

As described above, the crosstalk due to the high frequency signal contacts 21A for transmitting the high frequency differential signal significantly affects the electrical characteristics of the electrical connector 1. In the electrical connector 1 of the present disclosure, each of the two high frequency signal contacts 21A constituting the high frequency signal contact pair CP1 of each of the first contact group 21U and the second contact group 21L has the narrow pitch portion 216 approaching from one of the two high frequency signal contacts 21A toward the other one of the two high frequency signal contacts 21A and the narrow pitch section 271 is formed by the narrow pitch portions 216 of the two high frequency signal contacts 21A. Therefore, it is possible to effectively suppress the crosstalk due to the high frequency signal contacts 21A in the narrow pitch section 217 and thus it is possible to improve the electrical characteristics of the electrical connector 1.

FIG. 12 shows the planar view of the ground plate 22 viewed from the upper side. The ground plate 22 is arranged on the ground plane parallel to both of the first contact plane in which the first contact group 21U is arranged and the second contact plane in which the second contact group 21L is arranged and located between the first contact plane and the second contact plane. The ground plate 22 absorbs the influence of the current flowing in the contacts 21 of one of the first contact group 21U and the second contact group 21L arranged so as to be spaced apart from each other in the vertical direction to prevent the current flowing in the contacts 21 of the one of the first contact group 21U and the second contact group 21L from affecting against the contacts 21 of the other one of the first contact group 21U and the second contact group 21L for suppressing the crosstalk between the contacts 21 arranged so as to be spaced apart from each other in the vertical direction.

As shown in FIG. 12, the ground plate 22 contains a first ground plate piece 221 and a second ground plate piece 222. As shown in FIG. 7, the first ground plate piece 221 is a flat plate-like member made of a metal material. The first ground plate piece 221 is provided on the upper surface of the bottom housing 23B of the housing 23. Referring back to FIG. 12, the first ground plate piece 221 includes a flat plate-like body portion 2211 and terminal portions 2212 (see FIG. 5) extending toward the lower side (the −Y direction side) from a base end of the body portion 2211 and exposed from the housing 23 toward the outside.

The body portion 2211 of the first ground plate piece 221 is provided on the upper surface of the bottom housing 23B of the housing 23 so as to be parallel to the planes (the first contact plane and the second contact plane) in which the plurality of contacts 21 are arranged. Further, the body portion 2211 has a plurality of positioning holes 2213 through which pins for positioning the plurality of contacts

21 of the second contact group 21L are passed when the bottom housing 23B of the housing 23 is insert-molded so as to hold the second contact group 21L and the first ground plate piece 221, a plurality of tie-bar cut holes 2214 for performing the tie-bar cut method to punch the connecting portions connecting the plurality of contacts 21 of the second contact group 21L (that is, the contacts 21 of the second contact group 21L are connected to each other after the bottom housing 23B of the housing 23 has been insert-molded) to separate the contacts 21 of the second contact group 21L from each other and a plurality of flow openings 2215 for ensuring the flowability of the elastomer material within the housing 23 when the elastomer material is filled into the housing 23 for forming the waterproof sealing portion 24 in the housing 23 in a state that the top housing 23T and the bottom housing 23B of the housing 23 have been closely contacted to each other.

The positioning holes 2213 are formed in the body portion 2211 for enabling to respectively pass the positioning pins through the positioning holes 2213 for positioning the plurality of contacts 21 of the second contact group 21L at the time of insert-molding the bottom housing 23B so as to hold the second contact group 21L and the first ground plate piece 221. In this regard, the positioning pins for positioning the plurality of contacts 21 of the second contact group 21L may be passed through the tie-bar cut holes 2214 and the flow openings 2215 in addition to through the positioning holes 2213 when the bottom housing 23B is insert-molded. The number, positions and shapes of the positioning holes 2213 in the body portion 2211 are not particularly limited and these matters are appropriately set as necessary at the time of insert-molding the bottom housing 23B.

The tie-bar cut holes 2214 are formed in the body portion 2211 in order to perform the tie-bar cut method for punching the connecting portions of the plurality of contacts 21 of the second contact group 21L (that is, the contacts 21 of the second contact group 21L are connected to each other by the connecting portions after the bottom housing 23B has been insert-molded) to separate the plurality of contacts 21 of the second contact group 21L from each other. As described above, the positioning for the plurality of contacts 21 of the second contact group 21L with the positioning pins is performed when the bottom housing 23B is insert-molded. In order to more accurately perform the positioning for the plurality of contacts 21, for instance, the plurality of contacts 21 are held in a state that base end portions of the plurality of contacts 21 are connected to each other at the time of insert-molding the bottom housing 23B. Thus, the plurality of contacts 21 of the second contact group 21L are connected to each other by the connecting portions provided at the horizontally extending portions 212L at the time of insert-molding the bottom housing 23B. In the illustrated embodiment, the two high frequency signal contacts 21A constituting the high frequency signal contact pair CP1 and the two non-signal contacts 21C respectively located on the left and right sides of the high frequency signal contact pair CP1 among the plurality of contacts 21 constituting the second contact group 21L are connected to each other by the connecting portions. Thus, a first contact assembly and a second contact assembly are respectively constituted. Specifically, in FIGS. 10 and 11, the first contact assembly is constituted of the two high frequency signal contacts 21A constituting the high frequency signal contact pair CP1 located on the positive direction side of the X axis and the two non-signal contacts 21C respectively located on the left and right sides of the high frequency signal contact pair CP1. On the other hand, the second contact assembly is constituted of the two high frequency signal contacts 21A constituting the high frequency signal contact pair CP1 located on the negative direction side of the X axis and the two non-signal contacts 21C respectively located on the left and right sides of the high frequency signal contact pair CP1. Furthermore, the two normal signal contacts 21B constituting the normal signal contact pair CP2 and the two non-signal contacts 21C respectively located on the left and right sides of the normal signal contact pair CP2 are connected to each other by the connecting portions to constitute a third contact assembly. Thus, the plurality of contacts 21 constitute the three contact assemblies in which the four contacts 21 are connected to each other, that is the first contact assembly, the second contact assembly and the third contact assembly at the time of insert-molding the bottom housing 23B.

The tie-bar cut method is performed to punch the connecting portions of the four connected contacts 21 of the first contact assembly, the second contact assembly and the third contact assembly to separate the plurality of contacts 21 of the second contact group 21L from each other after the bottom housing 23B has been insert-molded. The plurality of contacts 21 of the second contact group 21L are separated from each other by the tie-bar cut method subjected to the four contacts 21 constituting each of the first contact assembly, the second contact assembly and the third contact assembly. As a result, the tie-bar cut mark 215L is formed at each of the plurality of contacts 21 of the second contact group 21L.

The tie-bar cut method is further performed on the plurality of contacts 21 of the first contact group 21U. Similar to the plurality of contacts 21 of the second contact group 21L, the plurality of contacts 21 of the first contact group 21U constitute a first contact assembly, a second contact assembly and a third contact assembly at the time of insert-molding the top housing 23T so as to hold the plurality of contacts 21 of the first contact group 21U. After the top housing 23T has been insert-molded, the connecting portions of the four contacts 21 constituting each of the first contact assembly, the second contact assembly and the third contact assembly are punched by performing the tie-bar cut method through the openings formed in the top housing 23T to separate the plurality of contacts 21 of the first contact group 21U from each other. As a result, the plurality of contacts 21 of the first contact group 21U are separated from each other and the tie-bar cut mark 215U is formed at each of the plurality of contacts 21 of the first contact group 21U.

The flow openings 2215 are used for filling the elastomer material into the housing 23 in the state that the lower surface of the top housing 23T and the upper surface of the bottom housing 23B of the housing 23 have been closely contacted with each other to form the waterproof sealing portion 24 (see FIG. 7) in the housing 23. The waterproof sealing portion 24 is an elastic member formed so as to surround and closely contact with a portion of each of the plurality of contacts 21 in the housing 23.

The waterproof sealing portion 24 encloses the portion of each of the plurality of contacts 21 therein in a state that the waterproof sealing portion 24 closely contacts with the portion of each of the plurality of contacts 21 in the housing 23. Thus, an inside of the housing 23 is liquid-tightly sealed by the waterproof sealing portion 24 and the waterproof sealing portion 24 can prevent water from penetrating into the housing 23 from the tip side toward the base side. As described above, the waterproof sealing portion 24 is located between the tip side and the base side in the housing 23 to block a water penetration path from the tip side to the base side in the housing 23. Thus, the waterproof sealing portion 24 can provide a waterproof function in the housing 23.

In the state that the lower surface of the top housing 23T of the housing 23 and the upper surface of the bottom housing 23B have been closely contacted with each other, the elastomer material is filled into the housing 23 through filling openings 233 of the top housing 23T and the bottom housing 23B (see FIGS. 7, 13 and 15) to form the waterproof sealing portion 24 in the housing 23. The flow openings 2215 are openings for ensuring the flowability of the elastomer material in the housing 23 at the time of forming the waterproof sealing portion 24.

The flow openings 2215 are formed at positions respectively facing the contacts 21 of the first contact group 21U and the contacts 21 of the second contact group 21L. In order to improve adhesion of the waterproof sealing portion 24 with respect to the portions of the contacts 21 of the first contact group 21U and the second contact group 21L, it is necessary to make the elastomer material closely contact with an entire circumference of each of the portions of the plurality of contacts 21 of the second contact group 21L located on the lower side of the flow openings 2215 when the elastomer material is filled into the housing 23 through the filling openings 233 of the top housing 23T and the bottom housing 23B. If the plurality of contacts 21 of the second contact group 21L overlap with the first ground plate piece 221 in areas where the contacts 21 should face the flow openings 2215 of the first ground plate piece 221 when they are viewed in planar view, the entire circumference of each of the portions of the plurality of contacts 21 of the second contact group 21L cannot be held by a molding tool (not shown) in the areas where the contacts 21 should face the flow openings 2215 of the first ground plate piece 221 when the bottom housing 23B is insert-molded. As a result, when the bottom housing 23B is inserted-molded, the insulating resin material for forming the bottom housing 23B flows around each of the portions of the plurality of contacts 21 of the second contact group 21L in the areas where the contacts 21 should face the flow openings 2215 of the first ground plate piece 221. Thus, the entire circumference of each of the portions of the plurality of contacts 21 of the second contact group 21L cannot be exposed due to the insulating resin material for forming the bottom housing 23B. In this case, when the waterproof sealing portion 24 is formed, it is impossible to form a space for allowing the elastomer material to closely contact with the entire circumference of each of the portions of the plurality of contacts 21 of the second contact group 21L. For this reason, in the electrical connector 1 of the present disclosure, it is necessary to completely expose the portions of the contacts 21 of the second contact group 21L with respect to the flow openings 2215 in the areas where the contacts 21 face the flow openings 2215 of the first ground plate piece 221.

For example, as shown in FIG. 20, a separation distance W2 between outer side surfaces of the two high frequency signal contacts 21A constituting the high frequency signal contact pair CP1 of the second contact group 21L is smaller than a width (a length in the X direction) W3 of the flowing opening 2215 facing the two high frequency signal contacts 21A constituting the high frequency signal contact pair CP1 of the second contact group 21L. As described above, the contacts 21 of the second contact group 21L are completely exposed to the flow opening 2215 in the area where the contacts 21 face the flow opening 2215 of the first ground plate piece 221. Thus, when the waterproof sealing portion 24 is formed, the elastomer material can sufficiently flow around the portions of the plurality of contacts 21 of the second contact group 21L to improve the adhesion of the waterproof sealing portion 24 with respect to the portions of the contacts 21 of the first contact group 21U and the second contact group 21L.

Further, as shown in FIG. 21, the body portion 2211 of the first ground plate piece 221 is located between the contacting portions 211U and the horizontally extending portions 212U of the contacts 21 of the first contact group 21U and the contacting portions 211L and the horizontally extending portions 212L of the contacts 21 of the second contact group 21L. With this arrangement, the influences of the currents respectively flowing in the contacting portions 211U, 211L and the horizontally extending portions 212U, 212L of the contacts 21 of the first contact group 21U and the second contact group 21L are absorbed by the body portion 2211 of the first ground plate piece 221. Thus, it is possible to suppress the crosstalk between the contacts 21 respectively arranged on the upper side and the lower side of the first ground piece 221.

Referring back to FIG. 12, the second ground plate piece 222 is a member made of a metal material. The second ground plate piece 222 is located on the ground plane on the base side (the −Z direction side) than the first ground plate piece 221. The second ground plate piece 222 includes a flat plate-like body portion 2221, a pair of protruding portions 2222 respectively extending toward the upper side (in the +Y direction) from both end portions of the body portion 2221 in the width direction thereof (the X direction) and a pair of electrically contacting portions 2223 respectively formed on the both end portions of the body portion 2221 in the width direction thereof (the X direction) and to be contacted with an inner surface of the shield member 4. The pair of protruding portions 2222 and the pair of the electrically contacting portions 2223 are located on the upper side (the +Y direction side) than the body portion 2221. With this configuration, the pair of protruding portions 2222 and the pair of electrically contacting portions 2223 of the second ground plate piece 222 do not contact with the first ground plate piece 221.

The body portion 2221 is a plate-like member located on the ground plane on the base side than the body portion 2211 of the first ground plate piece 221. The body portion 2221 of the second ground plate piece 222 is provided so as not to contact with the body portion 2211 of the first ground plate piece 221. Thus, there is a small space between the body portion 2211 of the first ground plate piece 221 and the body portion 2221 of the second ground plate piece 222 on the ground plane. As described above, since the pair of protruding portions 2222 and the pair of electrically contacting portions 2223 of the second ground plate piece 222 are provided so as not to contact with the first ground plate piece 221, the second ground plate piece 222 is separated from the first ground plate piece 221 and is not electrically connected to the first ground plate piece 221 directly.

The pair of protruding portions 2222 extend toward the upper side (the +Y direction side) from the both end portions of the body portion 2221 in the width direction thereof (the X direction). By respectively inserting the pair of protruding portions 2222 into press-fitting grooves 234 formed on the lower surface of the top housing 23T (see FIG. 13), the second ground plate piece 222 can be attached to the lower surface of the top housing 23T. In this regard, the second ground plate piece 222 is attached to the lower surface of the top housing 23T at any timing after the top housing 23T has been formed by the insert-molding and before the top housing 23T is integrated with the bottom housing 23B.

The pair of electrically contacting portions 2223 respectively extend toward the outer side from the both end portions of the body portion 2221 in the width direction thereof (the X direction). An outer profile of each of the electrically contacting portions 2223 is adapted to fit the inner surface of the shield member 4 (see FIG. 22). Grounding of the second ground plate piece 222 is achieved by making the pair of electrically contacting portions 2223 contact with the shield member 4.

As shown in FIG. 21, the body portion 2221 of the second ground plate piece 222 is located between the horizontally extending portions 212U of the contacts 21 of the first contact group 21U and the horizontally extending portions 212L, the downwardly extending portions 213L and the terminal portions 214L of the contacts 21 of the second contact group 21L. With this arrangement, the influences of the currents respectively flowing in the horizontally extending portions 212U of the contacts 21 of the first contact group 21U or the horizontally extending portions 212L, the downwardly extending portions 213L and the terminal portions 214L of the contacts 21 of the second contact group 21L are absorbed by the body portion 2221 of the second ground plate piece 222.

The ground plate 22 of the electrical connector 1 of the present disclosure includes the second ground plate piece 222 in addition to the first ground plate piece 221 used in the prior art. As described above, the electrical connector 1 of the present disclosure is configured so that the second ground plate piece 222 of the ground plate 22 is located in an area where a metal member such as a ground plate is not located in the prior art. More specifically, the electrical connector 1 of the present disclosure is configured so that the second ground plate piece 222 of the ground plate 22 is located between the horizontally extending portions 212U of the contacts 21 of the first contact group 21U and the horizontally extending portions 212L, the downwardly extending portions 213L and the terminal portions 214L of the contacts 21 of the second contact group 21L. Therefore, it is possible to more effectively suppress the crosstalk between the upper and lower contacts 21.

FIG. 13 shows the lower surface of the top housing 23T to which the second ground plate piece 222 should be attached. FIG. 14 shows the lower surface of the top housing 23T in a state that the first contact group 21U and the second ground plate piece 222 are held by the top housing 23T.

As shown in FIG. 13, the top housing 23T includes a base portion 231 located on the base side (the −Z direction side), a tongue portion 232 extending from the base portion 231 toward the tip side (the +Z direction side), the filling opening 233 formed in a base end portion of the tongue portion 232 and the pair of press-fitting grooves 234 formed on both end portions of a lower surface of the base portion 231 in the width direction thereof (the X direction). The top housing 23T is formed so as to hold the plurality of contacts 21 of the first contact group 21U by the insert-molding method. As shown in FIG. 14, the pair of protruding portions 2222 of the second ground plate piece 222 are respectively press-fitted into the pair of press-fitting grooves 234 formed on the lower surface of the insert-molded top housing 23T which is formed so as to hold the plurality of contacts 21 of the first contact group 21U. With this operation, the second ground plate piece 222 is fixed on the lower surface of the top housing 23T and thus the second ground plate piece 222 is held by the top housing 23T.

The tongue portion 232 has a plurality of positioning holes 2321 through which the pins for positioning the plurality of contacts 21 of the first contact group 21U are passed when the top housing 23T is insert-molded and a plurality of tie-bar cut holes 2322 for performing the tie-bar cut method for punching the connecting portions of the contacts 21 of the first contact group 21U (that is, the contacts 21 of the first contact group 21U are connected to each other by the connecting portions at the time of insert-molding the top housing 23T) to separate the plurality of contacts 21 of the first contact group 21U from each other.

FIG. 15 shows the upper surface of the bottom housing 23B on which the first ground plate piece 221 should be provided. FIG. 16 shows the upper surface of the bottom housing 23B in a state that the second contact group 21L and the first ground plate piece 221 are held by the bottom housing 23B.

As shown in FIG. 15, similarly to the top housing 23T, the bottom housing 23B has a base portion 231 located on the base side (the −Z direction side), a tongue portion 232 extending from the base portion 231 toward the tip side (the +Z direction side) and the filling opening 233 formed in a base end portion of the tongue portion 232. As shown in FIG. 16, the first ground plate piece 221 is provided on the upper surface of the bottom housing 23B and the plurality of contacts 21 of the second contact group 21L are held on the side of the lower surface of the bottom housing 23B. The bottom housing 23B is formed so as to hold the plurality of contacts 21 of the second contact group 21L and the first ground plate piece 221 by the insert-molding method.

The tongue portion 232 of the bottom housing 23B has a plurality of positioning holes 2321 which are respectively formed at positions corresponding to the positioning holes 2213 of the first ground plate piece 221 and through which the pins for positioning the plurality of contacts 21 of the second contact group 21L are passed when the bottom housing 23B is insert-molded and a plurality of tie-bar cut holes 2214 which are respectively formed at positions corresponding to the tie-bar cut holes 2214 of the first ground plate piece 221 for performing the tie-bar cut method for punching the connecting portions of the contacts 21 of the second contact group 21L (that is, the contacts 21 of the second contact group 21L are connected to each other by the connecting portions at the time of insert-molding the bottom housing 23B) to separate the plurality of contacts 21 of the second contact group 21L from each other.

As shown in FIG. 7, the housing 23 is formed by closely contacting the lower surface of the top housing 23T to which the second ground plate piece 222 is attached and the upper surface of the bottom housing 23B with each other. When the lower surface of the top housing 23T is closely contacted with the upper surface of the bottom housing 23B, the filling openings 233 of the top housing 23T and the bottom housing 23B overlap with the flow openings 2215 of the first ground plate piece 221 in planar view.

After the lower surface of the top housing 23T and the upper surface of the bottom housing 23B have been closely contacted with each other, the elastomer material is filled into the housing 23 through the filling openings 233 of the top housing 23T and the bottom housing 23B. The elastomer material filled into the housing 23 flows in the housing 23 through the flow openings 2215 of the first ground plate piece 221. Then, the waterproof sealing portion 24 is formed in the housing 23 by curing the elastomer material. The inside of the housing 23 is liquid-tightly sealed by the waterproof sealing portion 24 and the waterproof sealing portion 24 can prevent water from penetrating into the housing 23 from the tip side toward the base side.

After the waterproof sealing portion 24 has been formed, over-molding is subjected to the top housing 23T and the bottom housing 23B in order to integrate the top housing 23T and the bottom housing 23B. As a result, the outer mold 25 is formed. The top housing 23T and the bottom housing 23B are integrated by the outer mold 25. Further, as shown in FIGS. 6 and 23, the ring-shaped inner waterproof sealing member 26 made of an elastic material is attached to the outer peripheral surface of the outer mold 25. Thus, a space between the inner structure 2 and the inner surface of the shell 3 is liquid-tightly sealed by the inner waterproof sealing member 26. The inner waterproof sealing member 26 blocks a water penetration path of water between the inner structure 2 and the inner surface of the shell 3 from the tip side toward the base side. Thus, the inner waterproof sealing member 26 can provide a waterproof function between the inner structure 2 and the shell 3.

After the housing 23 has been formed so as to hold the first contact group 21U, the second contact group 21L, the first ground plate piece 221, the second ground plate piece 222 and the waterproof sealing portion 24 therein, the inner waterproof sealing member 26 is attached to the outer peripheral surface of the outer mold 25. As a result, the inner structure 2 can be obtained.

FIG. 17 is the perspective view showing the positional relationship among the first contact group 21U, the second contact group 21L, the first ground plate piece 221 and the second ground plate piece 222 in a state that the inner structure 2 is formed. FIG. 18 is the planar view showing the first contact group 21U, the second contact group 21L, the first ground plate piece 221 and the second ground plate piece 222 viewed from the upper side. FIG. 19 is the planar view of the first contact group 21U, the second contact group 21L, the first ground plate piece 221 and the second ground plate piece 222 viewed from the lower side. FIG. 20 is the partially enlarged view of the cross-sectional view taken along the B-B line in FIG. 18. FIG. 21 is the cross-sectional view taken along the C-C line in FIG. 18. In FIGS. 17 to 21, the components of the inner structure 2 other than the first contact group 21U, the second contact group 21L, the first ground plate piece 221 and the second ground plate piece 222 are omitted for the purpose of explanation. Further, only cross-sections of the contacts 21 and the first ground plate piece 221 are shown in FIG. 20 and other portions of the contacts 21 which can be viewed in the cross-sectional view taken along the B-B line are omitted for simplifying the drawing.

As shown in FIGS. 17 and 21, the first contact group 21U is located on the upper side of the first ground plate piece 221 and the second ground plate piece 222 and the second contact group 21L is located on the lower side of the first ground plate piece 221 and the second ground plate piece 222 in that state that the inner structure 2 is formed (see FIG. 6). Further, the first contact group 21U, the second contact group 21L, the first ground plate piece 221 and the second ground plate piece 222 are held so as to be separated and insulated from each other by the housing 23 (see FIG. 7).

As shown in FIGS. 17 and 21, the body portion 2211 of the first ground plate piece 221 is located between the contacting portions 211U and the horizontally extending portions 212U of the contacts 21 of the first contact group 21U and the contacting portions 211L and the horizontally extending portions 212L of the contacts 21 of the second contact group 21L in the state that the inner structure 2 is formed (see FIG. 6). Further, the body portion 2221 of the second ground plate piece 222 is located between the horizontally extending portions 212U of the contacts 21 of the first contact group 21U and the horizontally extending portions 212L, the downwardly extending portions 213L and the terminal portions 214L of the contacts 21 of the second contact group 21L. Thus, it is possible to suppress not only the crosstalk between the contacting portions 211U and the horizontally extending portions 212U of the contacts 21 of the first contact group 21U and the contacting portions 211L and the horizontally extending portions 212L of the contacts 21 of the second contact group 21L but also the crosstalk between the horizontally extending portions 212U of the contacts 21 of the first contact group 21U and the horizontally extending portions 212L, the downwardly extending portions 213L and the terminal portions 214L of the contacts 21 of the second contact group 21L. With this configuration, it is possible to more effectively suppress the crosstalk between the upper and lower contacts 21.

Further, as shown in FIG. 18, the narrow pitch portion 216 of each of the high frequency signal contacts 21A of the first contact group 21U is located on the upper side of the body portion 2211 of the first ground plate piece 221 and the body portion 2221 of the second ground plate piece 222. Namely, the narrow pitch section 217 is formed by the narrow pitch portions 216 of the two high frequency signal contacts 21A constituting the high frequency signal contact pair CP1 of the first contact group 21U so as to bridge over both of the body portion 2211 of the first ground plate piece 221 and the body portion 2221 of the second ground plate piece 222. As described above, since the first ground plate piece 221 and the second ground plate piece 222 do not contact with each other, there is an area between the first ground plate piece 221 and the second ground plate piece 222, in which a metal member for absorbing the influences of the currents flowing in the contacts 21 does not exist. In this area, the crosstalk between the upper and lower contacts 21 cannot be suppressed by the first ground plate piece 221 and the second ground plate piece 222. In particular, the influence of the crosstalk due to the two high frequency signal contacts 21A constituting the high frequency signal contact pair CP1 in which the high frequency differential signal flows increases in this area.

However, in the electrical connector 1 of the present disclosure, the narrow pitch sections 217 each formed by the narrow pitch portions 216 of the two adjacent high frequency signal contacts 21A of the first contact group 21U are located so as to bridge over the body portion 2211 of the first ground plate piece 221 and the body portion 2221 of the second ground plate piece 222. As described above, in the narrow pitch section 217, the influences of the noises caused by the two high frequency signal contacts 21A against the other contacts 21 cancel each other. Thus, the crosstalk due to the high frequency signal contact 21A is suppressed in the narrow pitch section 217. Therefore, it is possible to suppress the crosstalk between the upper and lower high frequency signal contacts 21A between the first ground plate piece 221 and the second ground plate piece 222.

On the other hand, as shown in FIG. 19, the narrow pitch portion 216 of each of the high frequency signal contacts 21A of the second contact group 21L is formed at a position facing the flow opening 2215 of the body portion 2211 of the first ground plate piece 221. In other words, the first ground plate piece 221 has the flow openings 2215 formed at positions respectively facing the two high frequency signal contacts 21A constituting the high frequency signal contact pairs CP1 of the first contact group 21U and the second contact group 21L. Further, each of the high frequency signal contacts 21A of the second contact group 21L has the narrow pitch portion 216 at the position facing the flow opening 2215 of the first ground plate piece 221.

As described above, the narrow pitch portion 216 of each of the two adjacent high frequency signal contacts 21A of the first contact group 21U is formed so as to bridge over both of the body portion 2211 of the first ground plate piece 221 and the body portion 2221 of the second ground plate piece 222, whereas the narrow pitch portion 216 of each of the two adjacent high frequency signal contacts 21A of the second contact group 21L is formed so as to face the flow opening 2215 of the first ground plate piece 221. Thus, in the planar view as shown in FIG. 18 or 19, that is in the planar view obtained by viewing the first contact group 21U, the second contact group 21L and the ground plate 22 from the upper side or the lower side, the narrow pitch portions 216 of the two adjacent high frequency signal contacts 21A of the first contact group 21U do not overlap with the narrow pitch portions 216 of the two adjacent high frequency signal contacts 21A of the second contact group 21L.

As described above, in order to fill the elastomer material into the housing 23 to form the waterproof sealing portion 24 in the housing 23, the flow openings 2215 are formed in the first ground plate piece 221. However, since there is no metal member for absorbing the influences of the currents flowing in the contacts 21 in areas where the flow openings 2215 of the first ground plate piece 221 are formed, it is impossible to suppress the crosstalk in the areas. In order to solve this problem, the electrical connector 1 of the present disclosure has a structural feature described in the following description for suppressing the crosstalk in the areas where the flow openings 2215 of the first ground plate piece 221 are formed.

FIG. 20 shows the partially enlarged view of the cross-sectional view taken along the B-B line in FIG. 18. In the cross-sectional view of FIG. 18, a vicinity of some flow openings 2215 of the first ground plate piece 221 is enlarged. As shown in FIG. 20, the two high frequency signal contacts 21A constituting the high frequency signal contact pair CP1 of the first contact group 21U face the two high frequency signal contacts 21A constituting the high frequency signal contact pair CP1 of the second contact group 21L through the flow opening 2215 of the first ground plate piece 221.

Further, in the area where the high frequency signal contacts 21A face the flow opening 2215, a center of a space between the two high frequency signal contacts 21A of the first contact group 21U in the width direction, a center of a space between the two high frequency signal contacts 21A of the second contact group 21L in the width direction and a center of the flow opening 2215 in the width direction coincide with each other. Namely, in the area where the high frequency signal contacts 21A face the flow opening 2215, the center of the two high frequency signal contacts 21A of the first contact group 21U, the center of the two high frequency signal contacts 21A of the second contact group 21L coincide with the center of the flow opening 2215.

As is clear from FIG. 20, a separation distance W1 between outer side surfaces of the two high frequency signal contacts 21A of the first contact group 21U facing the flow opening 2215 is larger than the width W3 of the flow opening 2215. In this regard, surfaces of the two high frequency signal contacts 21A facing each other are referred to as inner side surfaces of the two high frequency signal contacts 21A. Further, a surface opposite to the inner side surface of each of the two high frequency signal contacts 21A is referred to as the outer side surface of the high frequency signal contact 21A.

The separation distance W1 between the outer side surfaces of the two high frequency signal contacts 21A of the first contact group 21U is larger than the width W3 of the flow opening 2215. Thus, the two high frequency signal contacts 21A of the first contact group 21U are not completely exposed to the flow opening 2215 and outer portions of the two high frequency signal contacts 21A of the first contact group 21U partially face the body portion 2211 of the first ground plate piece 221. Thus, most of the influences of the currents flowing in the two high frequency signal contacts 21A of the first contact group 21U are absorbed by the body portion 2211 of the first ground plate piece 221 in the area where the two high frequency signal contacts 21A face the flow openings 2215. Therefore, in the area where the two high frequency signal contacts 21A face the flow opening 2215, it is possible to suppress the crosstalk due to the currents flowing in the two high frequency signal contacts 21A of the first contact group 21U.

On the other hand, each of the two high frequency signal contacts 21A constituting the high frequency signal contact pair CP1 of the second contact group 21L has the narrow pitch portion 216 at the position facing the flow opening 2215 as described above and thus the narrow pitch section 217 of the high frequency signal contacts 21A of the second contact group 21L is formed at the position facing the flow opening 2215. Therefore, in the area where the high frequency signal contacts 21A face the flow opening 2215, the separation distance W2 between the outer side surfaces of the two high frequency signal contacts 21A of the second contact group 21L is smaller than the separation distance W1 between the outer side surfaces of the two high frequency signal contacts 21A of the first contact group 21U.

As described above, in the narrow pitch section 217, the influences of the noises caused by the two high frequency signal contacts 21A against the other contacts 21 cancel each other. Thus, the crosstalk due to the high frequency signal contacts 21A can be suppressed in the narrow pitch section 217. Therefore, it is possible to suppress the crosstalk due to the high frequency signal contacts 21A of the second contact group 21L in the area where the high frequency signal contacts 21A face the flow opening 2215.

In the above description, the relationship among the separation distance W1 between the outer side surfaces of the two high frequency signal contacts 21A constituting one of the high frequency signal contact pairs CP1 of the first contact group 21U, the separation distance W2 between the outer side surfaces of the two high frequency signal contacts 21A constituting one of the high frequency signal contact pairs CP1 of the second contact group 21L and the width W3 of the flow opening 2215 facing them has been described with reference to FIG. 20. A relationship among the separation distance W1 between the outer side surfaces of the two high frequency signal contacts 21A constituting the other one of the high frequency signal contact pairs CP1 of the first contact group 21U, the separation distance W2 between the outer side surfaces of the two high frequency signal contacts 21A constituting the other one of high frequency signal contact pairs CP1 of the second contact group 21L and the width W3 of the flow opening 2215 facing them is the same as the relationship described in the above description.

As described above, the electrical connector 1 of the present disclosure is configured so that the separation distance W1 between the outer side surfaces of the two high frequency signal contacts 21A of the first contact group 21U is different from the separation distance W2 between the outer side surfaces of the two high frequency signal contacts 21A of the second contact group 21L in the area where the high frequency signal contacts 21A face the flow openings 2215. Therefore, it is possible to effectively suppress the crosstalk between the upper and lower high frequency signal contacts 21A in the area where the flow opening 2215 is formed.

Further, in the area where the high frequency signal contacts 21A face the flow opening 2215, the separation distance W2 between the outer side surfaces of the two high frequency signal contacts 21A of the second contact group 21L is smaller than the width W3 of the flow opening 2215. Thus, the two high frequency signal contacts 21A of the second contact group 21L are completely exposed to the flow opening 2215. Therefore, when the elastomer material is filled into the housing 23 through the filling openings 233 of the top housing 23T and the bottom housing 23B to form the waterproof sealing portion 24 in the housing 23, it is possible to improve the adhesion of the waterproof sealing portion 24 with respect to the portions of the contacts 21 of the first contact group 21U and the second contact group 21L as described above and thus it is possible to improve the waterproof performance in the housing 23.

As described above, the electrical connector 1 of the present disclosure contains the inner structure 2 having the various features for suppressing the crosstalk between the plurality of contacts 21. In particular, the electrical connector 1 of the present disclosure is configured so that the second ground plate piece 222 of the ground plate 22 is located in the area where the metal member such as a ground plate is not located in the prior art. More specifically, the electrical connector 1 of the present disclosure is configured so that the second ground plate piece 222 of the ground plate 22 is located between the horizontal extending portions 212U of the contacts 21 of the first contact group 21U and the horizontal extending portions 212L, the downwardly extending portions 213L and the terminal portions 214L of the contacts 21 of the second contact group 21L. Therefore, it is possible to effectively suppress the crosstalk between the contacts 21 of the first contact group 21U and the second contact group 21L.

Furthermore, the electrical connector 1 of the present disclosure is configured so that each of the two high frequency signal contacts 21A constituting the high frequency signal contact pair CP1 of each of the first contact group 21U and the second contact group 21L has the narrow pitch portion 216 approaching from one of the two high frequency signal contacts 21A toward the other one of the two high frequency signal contacts 21A and the narrow pitch section 217 is formed by the narrow pitch portions 216 of the two high frequency signal contacts 21A. By forming the narrow pitch portion 216 in each of the two high frequency signal contacts 21A, it is possible to suppress the crosstalk due to the two high frequency signal contacts 21A in the narrow pitch section 217.

Furthermore, the electrical connector 1 of the present disclosure is configured so that the separation distance W1 between the outer side surfaces of the two high frequency signal contacts 21A of the first contact group 21U is larger than the width W3 of the flow opening 2215 and the narrow pitch section 217 of the two high frequency signal contacts 21A of the second contact group 21L is formed so as to face the flow opening 2215 in the area where the high frequency signal contacts 21A face the flow opening 2215 of the first ground plate piece 221. Therefore, it is possible to effectively suppress the crosstalk between the upper and lower high frequency signal contacts 21A in the area where the flow opening 2215 is formed.

Referring back to FIG. 6, the shell 3 is a cylindrical member made of a metal material. The shell 3 covers the inner structure 2 from the outside. The shell 3 contains the inner structure 2 therein in a state that the shell 3 covers the inner structure 2 except the tip side and the base side thereof in the insertion and extraction direction of the corresponding connector (the Z direction). The shell 3 has the cylindrical body portion 31 and the ring-shaped locking portion 32 formed so as to outwardly protrude from the tip end portion of the outer periphery of the body portion 31.

The locking portion 32 is a ring-shaped portion formed so as to protrude from the tip end portion of the outer periphery of the body portion 31 toward the outside. The locking portion 32 has a function of locking the outer waterproof sealing member 5, which is provided so as to cover the tip end portion of the outer periphery of the body portion 31, from the tip side. In the shell 3, an outer diameter of a portion where the locking portion 32 is formed (an outer diameter of the locking portion 32) is larger than an outer diameter of the other portion where the locking portion 32 is not formed (an outer diameter of the body portion 31).

The shield member 4 has a function of covering the shell 3 and the plurality of contacts 21 of the first contact group 21U and the second contact group 21L and the ground plate 22 (the first ground plate piece 221 and the second ground plate piece 222) of the inner structure 2 from the outside to provide electromagnetic shielding (EMC) for these components.

The shield member 4 is made of a metal material. The shield member 4 has a cylindrical shape corresponding to the shell 3. In a state that the shield member 4 has been attached to the shell 3, a space is formed between a tip end portion of the shield member 4 and the locking portion 32 of the shell 3 and the outer waterproof sealing member 5 is attached to this space. As shown in FIG. 22, the inner surface of the shield member 4 contacts with the pair of electrically contacting portions 2223 of the second ground plate piece 222. With this configuration, the grounding of the second ground plate piece 222 is achieved.

Referring back to FIG. 6, the outer waterproof sealing member 5 is attached to the tip end side of the outer periphery of the body portion 31 of the shell 3 and held between the tip end portion of the shield member 4 and the locking portion 32 of the shell 3. The outer waterproof sealing member 5 is a ring-shaped member made of an elastic material. In a state that the electrical connector 1 has been attached to the electronic device, the outer waterproof sealing member 5 prevents water from penetrating into the electronic device through a space of an attachment port through which the electrical connector 1 is mounted.

FIG. 23 shows the cross-sectional view of an electrical connector 1. As shown in FIG. 23, the water penetration path from the tip side toward the base side in the housing 23 is blocked by the waterproof sealing portion 24 to provide the waterproof function in the housing 23. On the other hand, the water penetration path from the tip side toward the base side between the inner surface of the housing 23 and the shell 3 is blocked by the inner waterproof sealing member 26 to provide the waterproof function in the shell 3. Furthermore, the outer waterproof sealing member 5 is attached to the tip end portion of the outer periphery of the body portion 31 of the shell 3 to prevent water from penetrating into the electronic device in which the electrical connector 1 is mounted.

Second Embodiment

Figure 24:
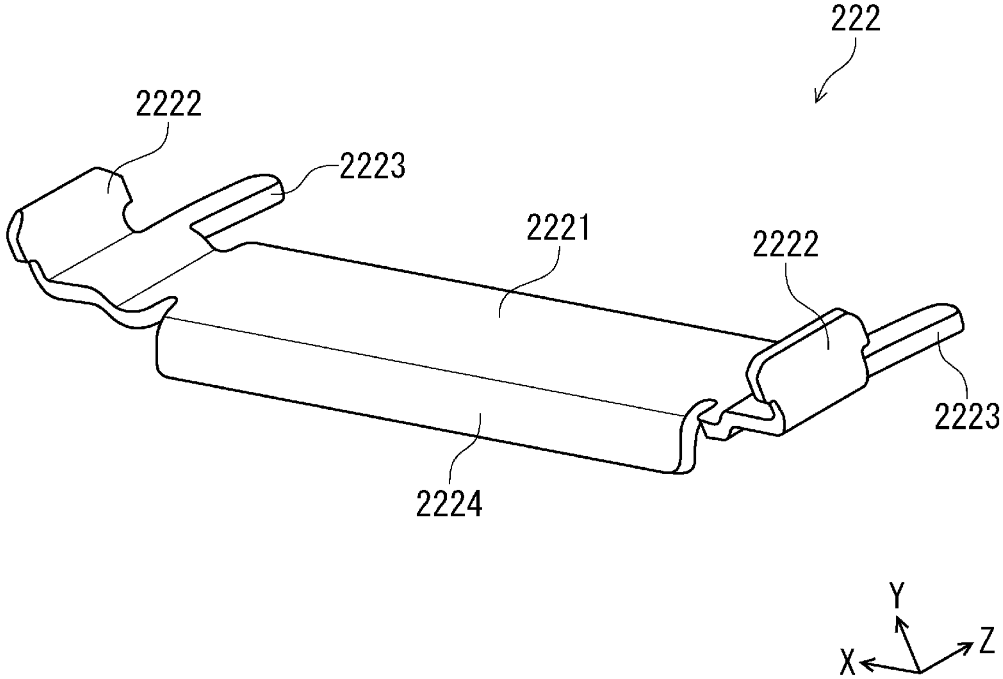
FIG. 24 is a perspective view of a second ground plate piece of an electrical connector according to a second embodiment of the present disclosure.
Figure 25:
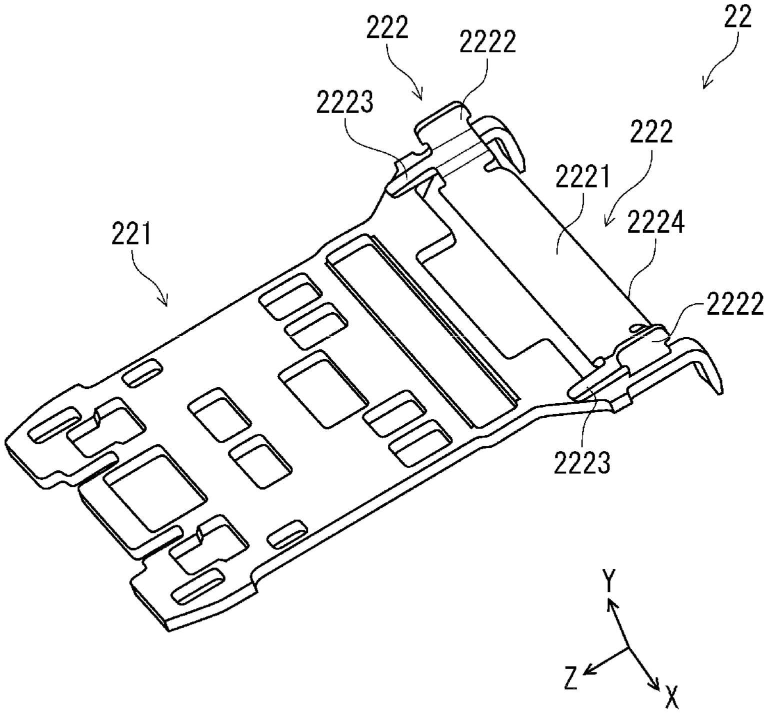
FIG. 25 is a perspective view of the ground plate of the electrical connector according to the second embodiment of the present disclosure.
Figure 26:
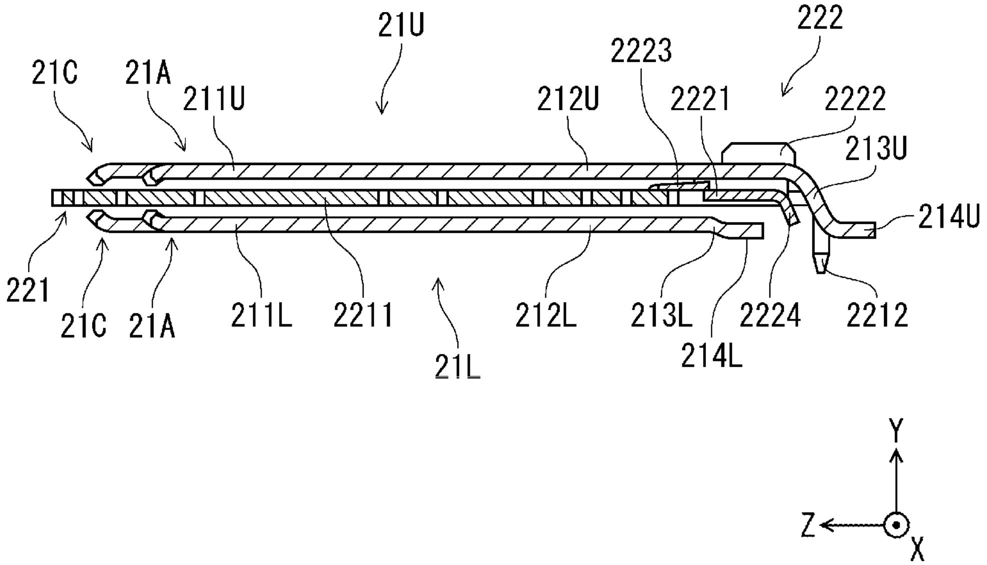
FIG. 26 is a cross-sectional view in the Y-Z plane for explaining a positional relationship among the first contact group, the second contact group, the first ground plate piece and the second ground plate piece in the electrical connector according to the second embodiment of the present disclosure.

Next, an electrical connector according to a second embodiment of the present disclosure will be described in detail with reference to FIGS. 24 to 26. FIG. 24 is a perspective view of the second ground plate piece of the electrical connector according to the second embodiment of the present disclosure. FIG. 25 is a perspective view of the ground plate of the electrical connector according to the second embodiment of the present disclosure. FIG. 26 is a cross-sectional view in the Y-Z plane for explaining a positional relationship among the first contact group, the second contact group, the first ground plate piece and the second ground plate piece in the electrical connector according to the second embodiment of the present disclosure. In FIG. 26, the components other than the first contact group 21U, the second contact group 21L, the first ground plate piece 221 and the second ground plate piece 222 are omitted for the purpose of explanation.

Hereinafter, the electrical connector 1 of the second embodiment will be described by placing emphasis on the points differing from the electrical connector 1 of the first embodiment with the same matters being omitted from the description. The electrical connector 1 of the present embodiment has the same configuration as that of the electrical connector 1 of the first embodiment except that the configuration of the second ground plate piece 222 is modified.

FIG. 24 shows the second ground plate piece 222 of the electrical connector 1 of the present embodiment. The second ground plate piece 222 of the present embodiment includes the flat plate-like body portion 2221, the pair of protruding portions 2222 respectively extending toward the upper side (the +Y direction side) from the both end portions of the body portion 2221 in the width direction thereof (the X direction), a pair of electrically contacting portions 2223 respectively formed on the both end portions of the body portion 2221 in the width direction thereof (the X direction) and to be contacted with the first ground plate piece 221 and an extending portion 2224 extending toward the lower side (in the −Y direction) from a base end portion of the body portion 2221.

Since the body portion 2221 and the pair of protruding portions 2222 are the same as those of the second ground plate piece 222 of the first embodiment, description for the body portion 2221 and the pair of protruding portions 2222 is omitted. On the other hand, the pair of electrically contacting portions 2223 of the second ground plate piece 222 of the present embodiment extend toward the tip side (the +Z direction side) from the both end portions of the body portion 2221 in the width direction thereof. As shown in FIG. 25, the pair of electrically contacting portions 2223 contact with the first ground plate piece 221 and do not contact with the shield member 4. Thus, in the present embodiment, the second ground plate piece 222 is electrically connected to the first ground plate piece 221.

As shown in FIG. 26, the extending portion 2224 extends toward the lower side (the −Y direction side) from the base end portion of the body portion 2221 so as to be located between the downwardly extending portions 2224 of the contacts of the first contact group 21U and the downwardly extending portions 213L and the terminal portions 214L of the contacts of the second contact group 21L in the state that the inner structure 2 is formed. Namely, the extending portion 2224 is located between the downwardly extending portions 213U of the contacts 21 of the first contact group 21U and the downwardly extending portions 213L and the terminal portions 214L of the contacts 21 of the second contact group 21L in the state that the inner structure 2 is formed.

In the first embodiment, any metal member for absorbing the influences of the currents flowing in the contacts 21 does not exist between the downwardly extending portions 213U of the contacts 21 of the first contact group 21U and the downwardly extending portions 213L and the terminal portions 214L of the contacts 21 of the second contact group 21L. On the other hand, the extending portion 2224 exists between the downwardly extending portions 213U of the contacts 21 of the first contact group 21U and the downwardly extending portions 213L and the terminal portions 214L of the contacts 21 of the second contact group 21L in the present embodiment. Thus, it is possible to more effectively suppress the crosstalk between the upper and lower contacts 21.

Although the electrical connector of the present disclosure has been described above with reference to the illustrated embodiments, an electronic device comprising the above-described electrical connector of the present disclosure is also involved within the scope of the present disclosure. The electronic device of the present disclosure contains a housing, a circuit board (not shown) provided in the housing and the electrical connector described above, which is mounted on the circuit board.

Although the electrical connector and the electronic device of the present disclosure have been described with reference to the illustrated embodiments, the present disclosure is not limited thereto. Each configuration of the present disclosure can be replaced with any configuration capable of performing the same function or any configuration can be added to each configuration of the present disclosure.

For example, although the second ground plate piece 222 is attached to the top housing 23T by respectively press-fitting the pair of protruding portions 2222 into the pair of press-fitting grooves 234 formed on the lower surface of the top housing 23T after the top housing 23T has been insert-molded in each embodiment of the electrical connector 1, the present disclosure is not limited thereto. For example, the top housing 23T may be formed so as to hold the first contact group 21U and the second ground plate piece 222 by the insert-molding method.

A person having ordinary skills in the art and the technique pertaining to the present disclosure may modify the configuration of the electrical connector of the present disclosure described above without meaningfully departing from the principle, the spirit and the scope of the present disclosure and the electrical connector having the modified configuration is also involved in the scope of the present disclosure. For example, an aspect in which the electrical connectors of the first embodiment and the second embodiment are arbitrary combined is also involved within the scope of the present disclosure.

Also, the number and types of the components of the electrical connector shown in FIGS. 4 to 26 are merely illustrative examples and the present disclosure is not necessarily limited thereto. An aspect in which any component is added or combined or any component is omitted without departing from the principle and intent of the present disclosure is also involved within the scope of the present disclosure.

Figure 27:
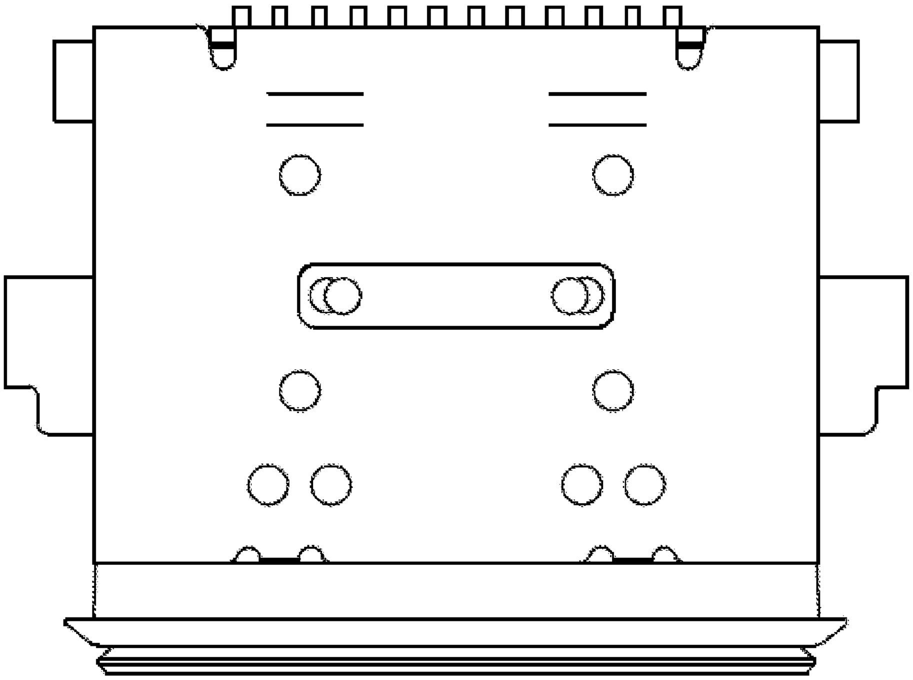
FIG. 27 is a planar view of the electrical connector according to the first embodiment of the present disclosure.
Figure 28:
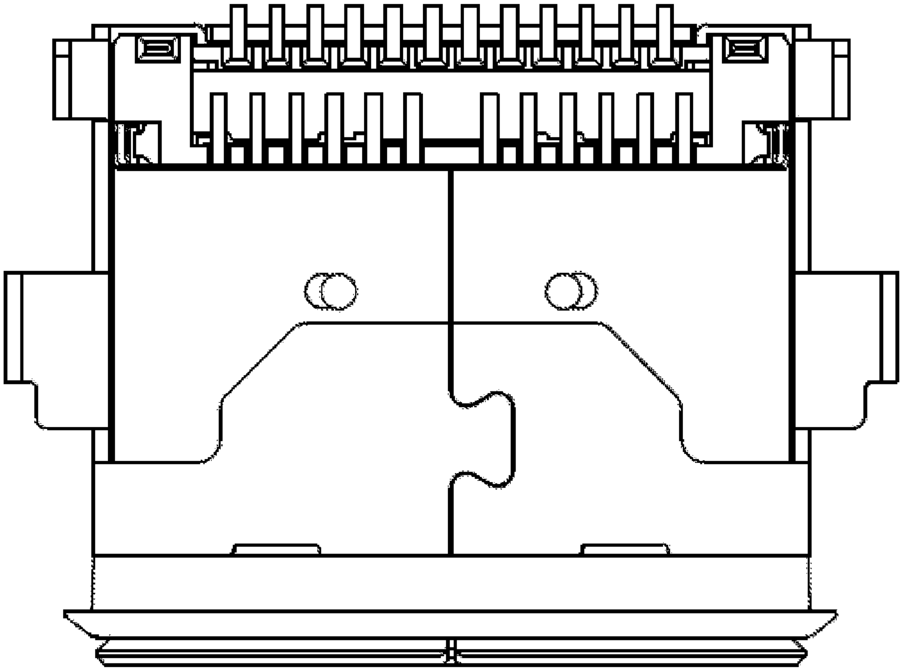
FIG. 28 is a bottom view of the electrical connector according to the first embodiment of the present disclosure.
Figure 29:
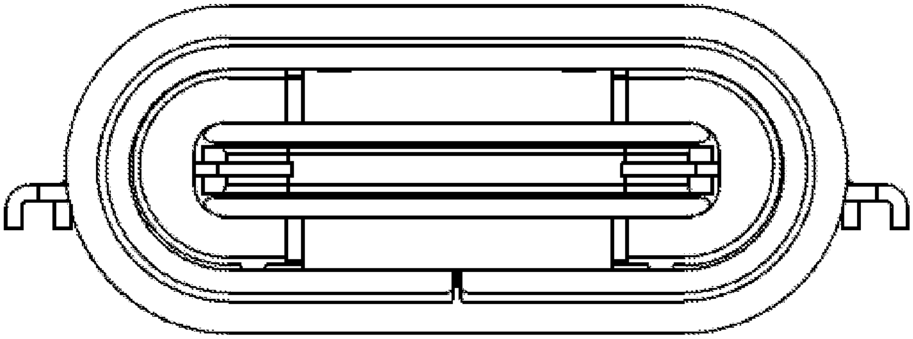
FIG. 29 is a front view of the electrical connector according to the first embodiment of the present disclosure.
Figure 30:
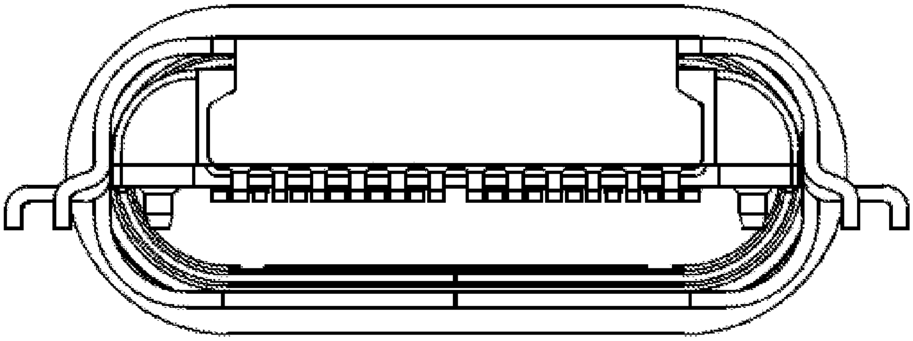
FIG. 30 is a rear view of the electrical connector according to the first embodiment of the present disclosure.

In addition, FIGS. 27 to 32 show six side views of the electrical connector according to the first embodiment of the present disclosure for reference. FIG. 27 is a planar view of the electrical connector according to the first embodiment of the present disclosure. FIG. 28 is a bottom view of the electrical connector according to the first embodiment of the present disclosure. FIG. 29 is a front view of the electrical connector according to the first embodiment of the present disclosure. FIG. 30 is a rear view of the electrical connector according to the first embodiment of the present disclosure.

Figure 31:
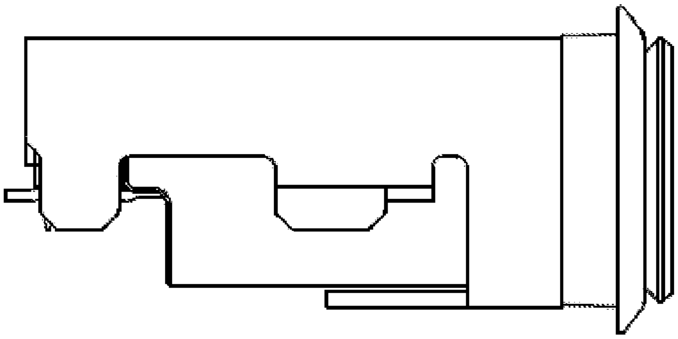
FIG. 31 is a left-side view of the electrical connector according to the first embodiment of the present disclosure.

FIG. 31 is a left-side view of the electrical connector according to the first embodiment of the present disclosure.

Figure 32:
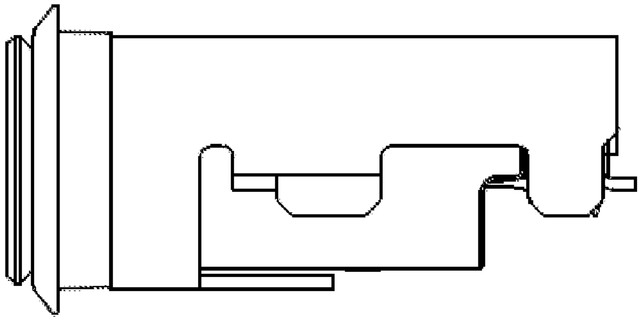
FIG. 32 is a right-side view of the electrical connector according to the first embodiment of the present disclosure.

FIG. 32 is a right-side view of the electrical connector according to the first embodiment of the present disclosure.

FIGS. 4-32 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electrical connector which can engage with a corresponding connector inserted from a tip side thereof, comprising:

an insulating housing;

a first contact group constituted of a first plurality of contacts linearly extending along an insertion and extraction direction of the corresponding connector and held by the insulating housing so as to be arranged on a first contact plane;

a second contact group constituted of a second plurality of contacts linearly extending along the insertion and extraction direction of the corresponding connector and held by the insulating housing so as to be arranged on a second contact plane facing the first contact plane; and a ground plate held by the insulating housing so as to be arranged on a ground plane facing the first contact plane and the second contact plane therebetween, wherein each of the first contact group and the second contact group contains a signal contact pair for transmitting a differential signal, wherein each of two contacts constituting the signal contact pair of each of the first contact group and the second contact group has a narrow pitch portion approaching from one of the two contacts toward another one of the two contacts, wherein the ground plate contains a first ground plate piece and a second ground plate piece located on a base side of the first ground plate piece so that the second ground plate piece is separated from the first ground plate piece and does not contact with the first ground plate piece, wherein the narrow pitch portion of each of the two contacts constituting the signal contact pair of the first contact group is located between the first ground plate piece and the second ground plate piece in a planar view, and wherein the narrow pitch portion of each of the two contacts constituting the signal contact pair of the second contact group faces is not located between the first ground plate piece and the second ground plate piece in the planar view.

2. The electrical connector as claimed in claim 1, wherein the first ground piece includes a flat plate-like body portion located on the ground plane, wherein the second ground piece includes a flat plate-like body portion located on the ground plane, wherein the flat plate-like body portion of the first ground piece is separated from the flat plate-like body portion of the second ground piece, and wherein the narrow pitch portions of the two contacts constituting the signal contact pair face a space between the flat plate-like body portion of the first ground plate piece and the flat plate-like body portion of the second group plate piece.

3. The electrical connector as claimed in claim 2, wherein the narrow pitch portion of each of the two contacts constituting the signal contact pair of the first contact group is located between the flat plate-like body portion of the first ground plate piece and the flat plate-like body portion of the second ground plate piece in the planar view.

4. The electrical connector as claimed in claim 1, wherein the first ground plate piece of the ground plate has an opening at a position facing the two contacts of the signal contact pair of each of the first contact group and the second contact group, wherein the narrow pitch portion of each of the two contacts of the signal contact pair of the second contact group faces the opening of the first ground plate piece, and wherein the narrow pitch portion of each of the two contacts of the signal contact pair of the first contact group does not face the opening of the first ground plate piece.

5. The electrical connector as claimed in claim 4, wherein a width of the narrow pitch portion of each of the two contacts of the signal contact pair of the second contact group is smaller than a width of the opening of the first ground plate piece.

6. The electrical connector as claimed in claim 1, wherein the narrow pitch portions of the two contacts constituting the signal contact pair of the first contact group are located so as to bridge over the first ground plate piece and the second group plate piece.

7. The electrical connector as claimed in claim 1, wherein a separation distance between the narrow pitch portions of the two contacts constituting the signal contact pair of each of the first contact group and the second contact group is smaller than a separation distance between other portions of the two contacts.

8. The electrical connector as claimed in claim 1, wherein each of the plurality of contacts of the first contact group and the second contact group has a contacting portion which is located on the tip side and to be contacted with the corresponding connector, a horizontally extending portion horizontally extending from the contacting portion toward a base side, a downwardly extending portion downwardly extending from the horizontally extending portion and a terminal portion extending from the downwardly extending portion toward the base side, and wherein the narrow pitch portion of each of the two contacts of the signal contact pair of each of the first contact group and the second contact group is formed at the horizontally extending portion.

9. The electrical connector as claimed in claim 1, wherein the narrow pitch portion has an approaching portion approaching from the one of the two contacts toward the other one of the two contacts and a straight portion extending from the approaching portion along the insertion and extraction direction.

10. An electronic device comprising:

a housing;

a circuit board provided in the housing; and the electrical connector defined by claim 1, which is mounted on the circuit board.

11. An electrical connector which can engage with a corresponding connector inserted from a tip side thereof, comprising:

an insulating housing;

a first contact group constituted of a first plurality of contacts linearly extending along an insertion and extraction direction of the corresponding connector and held by the insulating housing so as to be arranged on a first contact plane;

a second contact group constituted of a second plurality of contacts linearly extending along the insertion and extraction direction of the corresponding connector and held by the insulating housing so as to be arranged on a second contact plane facing the first contact plane; and a ground plate held by the insulating housing so as to be arranged on a ground plane facing the first contact plane and the second contact plane therebetween, wherein each of the first contact group and the second contact group contains a signal contact pair for transmitting a differential signal, wherein each of two contacts constituting the signal contact pair of each of the first contact group and the second contact group has a narrow pitch portion approaching from one of the two contacts toward another one of the two contacts, wherein the ground plate contains a first ground plate piece and a second ground plate piece located on a base side of the first ground plate piece so that the second ground plate piece is separated from the first ground plate piece and does not contact with the first ground plate piece, wherein the first ground plate piece of the ground plate has an opening at a position facing the two contacts of the signal contact pair of each of the first contact group and the second contact group, wherein the narrow pitch portion of each of the two contacts of the signal contact pair of the second contact group faces the opening of the first ground plate piece, and wherein the narrow pitch portion of each of the two contacts of the signal contact pair of the first contact group does not face the opening of the first ground plate piece.

12. An electronic device comprising:

a housing;

a circuit board provided in the housing; and the electrical connector defined by claim 11, which is mounted on the circuit board.

* * * * *